(12) United States Patent
Khan

(10) Patent No.: US 10,325,228 B2
(45) Date of Patent: Jun. 18, 2019

(54) RULES BASED DRIVER SELECTION

(71) Applicant: Zemcar, Inc., Bedford, MA (US)

(72) Inventor: Bilal W. Khan, Bedford, MA (US)

(73) Assignee: Zemcar, Inc., Bedford, MA (US)

( * ) Notice: Subject to any disclaimer, the term of this patent is extended or adjusted under 35 U.S.C. 154(b) by 0 days.

(21) Appl. No.: 15/337,636

(22) Filed: Oct. 28, 2016

(65) Prior Publication Data

US 2017/0124506 A1 May 4, 2017

Related U.S. Application Data

(60) Provisional application No. 62/248,647, filed on Oct. 30, 2015.

(51) Int. Cl.
| | |
|---|---|
| *G06Q 10/00* | (2012.01) |
| *G06Q 10/06* | (2012.01) |
| *G06Q 30/02* | (2012.01) |
| *G06Q 50/30* | (2012.01) |

(52) U.S. Cl.
CPC . *G06Q 10/063112* (2013.01); *G06Q 30/0282* (2013.01); *G06Q 50/30* (2013.01)

(58) Field of Classification Search
None
See application file for complete search history.

(56) References Cited

U.S. PATENT DOCUMENTS

| | | | | |
|---|---|---|---|---|
| 2005/0075119 | A1* | 4/2005 | Sheha | G01C 21/26 |
| | | | | 455/456.6 |
| 2006/0055779 | A1 | 3/2006 | Li | |
| 2006/0276960 | A1* | 12/2006 | Adamczyk | G06Q 10/06 |
| | | | | 701/516 |
| 2007/0273762 | A1 | 11/2007 | Steensma et al. | |
| 2008/0270019 | A1* | 10/2008 | Anderson | G01C 21/3438 |
| | | | | 701/533 |
| 2008/0277183 | A1* | 11/2008 | Huang | B60R 25/00 |
| | | | | 180/271 |
| 2010/0279627 | A1* | 11/2010 | Bradley | H04M 1/72577 |
| | | | | 455/69 |
| 2011/0059693 | A1* | 3/2011 | O'Sullivan | G06Q 10/00 |
| | | | | 455/41.1 |

(Continued)

OTHER PUBLICATIONS

Google will not run Circles around Facebook, Jul. 19, 2011, Social Media Observatory, p. 1-9.*

(Continued)

*Primary Examiner* — Joseph M Waesco

(74) *Attorney, Agent, or Firm* — Fish & Richardson P.C.

(57) ABSTRACT

A method includes receiving a request for a ride from a user via a computer-implemented driver assignment platform; for each of multiple drivers, implementing, by the driver assignment platform, (1) a first rule to determine a first metric of trust for the driver, the first level of trust associated with the user, and (2) a second rule to determine a second metric of trust for the driver, the second metric of trust associated with multiple other users of the driver assignment platform; implementing, by the driver assignment platform, a selection rule to select a particular driver from the multiple drivers based on a combination of the first metric of trust and the second metric of trust; and assigning the selected driver to provide the ride for the user.

27 Claims, 16 Drawing Sheets

(56) References Cited

U.S. PATENT DOCUMENTS

| | | | | |
|---|---|---|---|---|
| 2012/0203599 A1* | 8/2012 | Choi | ................. | G06Q 30/02 |
| | | | | 705/13 |
| 2012/0290652 A1* | 11/2012 | Boskovic | ............. | G06Q 10/02 |
| | | | | 709/204 |
| 2013/0091540 A1* | 4/2013 | Chen | ................. | H04W 4/21 |
| | | | | 726/1 |
| 2013/0132140 A1* | 5/2013 | Amin | ................. | G06Q 10/02 |
| | | | | 705/7.13 |
| 2013/0132246 A1* | 5/2013 | Amin | ................. | G06Q 40/10 |
| | | | | 705/34 |
| 2013/0138484 A1 | 5/2013 | Wu | | |
| 2013/0246207 A1* | 9/2013 | Novak | ............. | G06Q 30/0283 |
| | | | | 705/26.2 |
| 2013/0246301 A1* | 9/2013 | Radhakrishnan | .. | G06Q 30/0282 |
| | | | | 705/347 |
| 2014/0129302 A1* | 5/2014 | Amin | ................. | G06Q 50/30 |
| | | | | 705/13 |
| 2014/0129951 A1* | 5/2014 | Amin | ................. | G06Q 50/30 |
| | | | | 715/738 |
| 2014/0309863 A1 | 10/2014 | Ricci | | |
| 2014/0375800 A1 | 12/2014 | Lim et al. | | |
| 2015/0161564 A1* | 6/2015 | Sweeney | ........ | G06Q 10/063114 |
| | | | | 705/338 |
| 2015/0161752 A1* | 6/2015 | Barreto | ................. | G06Q 50/30 |
| | | | | 705/7.15 |
| 2015/0204684 A1* | 7/2015 | Rostamian | ......... | G01C 21/3438 |
| | | | | 701/537 |
| 2015/0356703 A1* | 12/2015 | Ellis | ................. | G06Q 50/30 |
| | | | | 705/7.17 |
| 2016/0110836 A1* | 4/2016 | Garg | ................. | G06Q 20/405 |
| | | | | 705/13 |
| 2016/0300242 A1* | 10/2016 | Truong | ............. | G10L 17/22 |
| 2016/0300318 A1* | 10/2016 | Godil | ................. | G06Q 50/30 |
| 2016/0363458 A1* | 12/2016 | Guo | ................. | H04L 67/18 |
| 2017/0127215 A1 | 5/2017 | Khan | | |

OTHER PUBLICATIONS

International Search Report and Written Opinion for corresponding PCT Appl No. PCT/US2016/059474, dated Feb. 17, 2017.
International Search Report and Written Opinion for corresponding PCT Appl No. PCT/US16/59448, dated Jan. 24, 2017.

* cited by examiner

RULES BASED DRIVER SELECTION

CLAIM OF PRIORITY

This application claims priority under 35 USC § 119(e) to U.S. Patent Application Ser. No. 62/248,647, filed on Oct. 30, 2015, the entire contents of which are hereby incorporated by reference

BACKGROUND

On-demand mobility is a trend in transportation services today. On-demand mobility relates to moving people, goods, or services with the assistance of a computer, such as an application operable on a mobile computing device, that allows for ease of scheduling and payment. On-demand mobility services can bring convenience to user's lives. In some cases, the security and privacy of users can be diminished with this convenience.

SUMMARY

In an aspect, a method includes receiving a request for a ride from a user via a computer-implemented driver assignment platform; for each of multiple drivers, implementing, by the driver assignment platform, (1) a first rule to determine a first metric of trust for the driver, the first level of trust associated with the user, and (2) a second rule to determine a second metric of trust for the driver, the second metric of trust associated with multiple other users of the driver assignment platform; implementing, by the driver assignment platform, a selection rule to select a particular driver from the multiple drivers based on a combination of the first metric of trust and the second metric of trust; and assigning the selected driver to provide the ride for the user.

Embodiments can include one or more of the following features.

Implementing the selection rule includes selecting the driver having a highest value for the combination of the first metric of trust and the second metric of trust.

Implementing a first rule to determine a first metric of trust includes assigning the driver to a particular level of multiple levels of a circle of trust associated with the user.

The method includes assigning the driver to the particular level based on information indicative of a past interaction between the user and the driver.

The method includes assigning the driver to the particular level based on input from the user indicative of the particular level.

Implementing a second rule to determine a second metric of trust includes determining the second metric of trust based on a rating of the driver from each of one or more of the multiple other users.

The method includes determining the second metric of trust based on a rating of the driver from one or more other users connected to the user in a social network.

Implementing a second rule to determine a second metric of trust includes determining the second metric of trust based on information indicative of past performance of the driver.

Implementing a second rule to determine a second metric of trust includes determining the second metric of trust based on ride data automatically collected from the driver during one or more rides provided by the driver.

The method includes setting a fare for the ride based on one or more of the first metric of trust and the second metric of trust for the selected driver.

The method includes implementing, by the driver assignment platform, a selection rule to select a second driver from the multiple drivers based on a combination of the first metric of trust and the second metric of trust; and assigning the second driver as a back-up driver for the ride.

The method includes providing information about the requested ride to the selected driver; and receiving confirmation from the selected driver, in which the selected driver is assigned to provide the ride for the user upon receipt of confirmation from the selected driver.

The method includes providing information about the selected driver to the user.

The method includes enabling rendering of a graphical display of the first metric for each of multiple drivers.

The graphical display includes multiple concentric circles, and in which each driver is positioned within one of the multiple concentric circles based on the first metric for the driver.

In an aspect, a computer readable medium stores instructions for causing a computing system to receive a request for a ride from a user; for each of multiple drivers, implement (1) a first rule to determine a first metric of trust for the driver, the first level of trust associated with the user, and (2) a second rule to determine a second metric of trust for the driver, the second metric of trust associated with multiple other users of the driver assignment platform; implement a selection rule to select a particular driver from the multiple drivers based on a combination of the first metric of trust and the second metric of trust; and assign the selected driver to provide the ride for the user.

Embodiments can include one or more of the following features.

Implementing the selection rule includes selecting the driver having a highest value for the combination of the first metric of trust and the second metric of trust.

Implementing a first rule to determine a first metric of trust includes assigning the driver to a particular level of multiple levels of a circle of trust associated with the user.

Implementing a second rule to determine a second metric of trust includes determining the second metric of trust based on a rating of the driver from each of one or more of the multiple other users.

The instructions cause the computing system to determine the second metric of trust based on a rating of the driver from one or more other users connected to the user in a social network.

The instructions cause the computing system to set a fare for the ride based on one or more of the first metric of trust and the second metric of trust for the selected driver.

The instructions cause the computing system to implement a selection rule to select a second driver from the multiple drivers based on a combination of the first metric of trust and the second metric of trust; and assign the second driver as a back-up driver for the ride.

The instructions cause the computing system to enable rendering of a graphical display of the first metric for each of multiple drivers.

The graphical display includes multiple concentric circles, and in which each driver is positioned within one of the multiple concentric circles based on the first metric for the driver.

In an aspect, a computing system includes a processor and memory configured to receive a request for a ride from a user; for each of multiple drivers, implement (1) a first rule to determine a first metric of trust for the driver, the first level of trust associated with the user, and (2) a second rule to determine a second metric of trust for the driver, the second metric of trust associated with multiple other users of the driver assignment platform; implement a selection rule to select a particular driver from the multiple drivers based on a combination of the first metric of trust and the second metric of trust; and assign the selected driver to provide the ride for the user.

Embodiments can have one or more of the following features.

Implementing the selection rule includes selecting the driver having a highest value for the combination of the first metric of trust and the second metric of trust.

Implementing a first rule to determine a first metric of trust includes assigning the driver to a particular level of multiple levels of a circle of trust associated with the user.

Implementing a second rule to determine a second metric of trust includes determining the second metric of trust based on a rating of the driver from each of one or more of the multiple other users.

The processor and memory are configured to set a fare for the ride based on one or more of the first metric of trust and the second metric of trust for the selected driver.

The processor and memory are configured to enable rendering of a graphical display of the first metric for each of multiple drivers.

DETAILED DESCRIPTION

In on-demand transportation services, in which a service provider (e.g., a driver) takes a service receiver (e.g., a rider) from one point to another in a private vehicle, the security and privacy of users are important. The approaches described here relate to reducing or minimizing the risk of violating a user's security or privacy. For instance, these approaches relate to automated, rules-based selection and assignment of a driver for a certain user when the user requests a ride using a computing device, such as a mobile computing device. This selection and assignment of driver can be based on factors such as the level of trust that the user has on the driver. For instance, an on-demand and scheduling service system implements one or more trust rules to determine the level of trust that user has for each of one or more different drivers. A driver is selected to provide the requested ride to the user based on the level of trust the user has for the driver; for instance, the driver who is the most trusted by the user can be selected.

Figure 1:
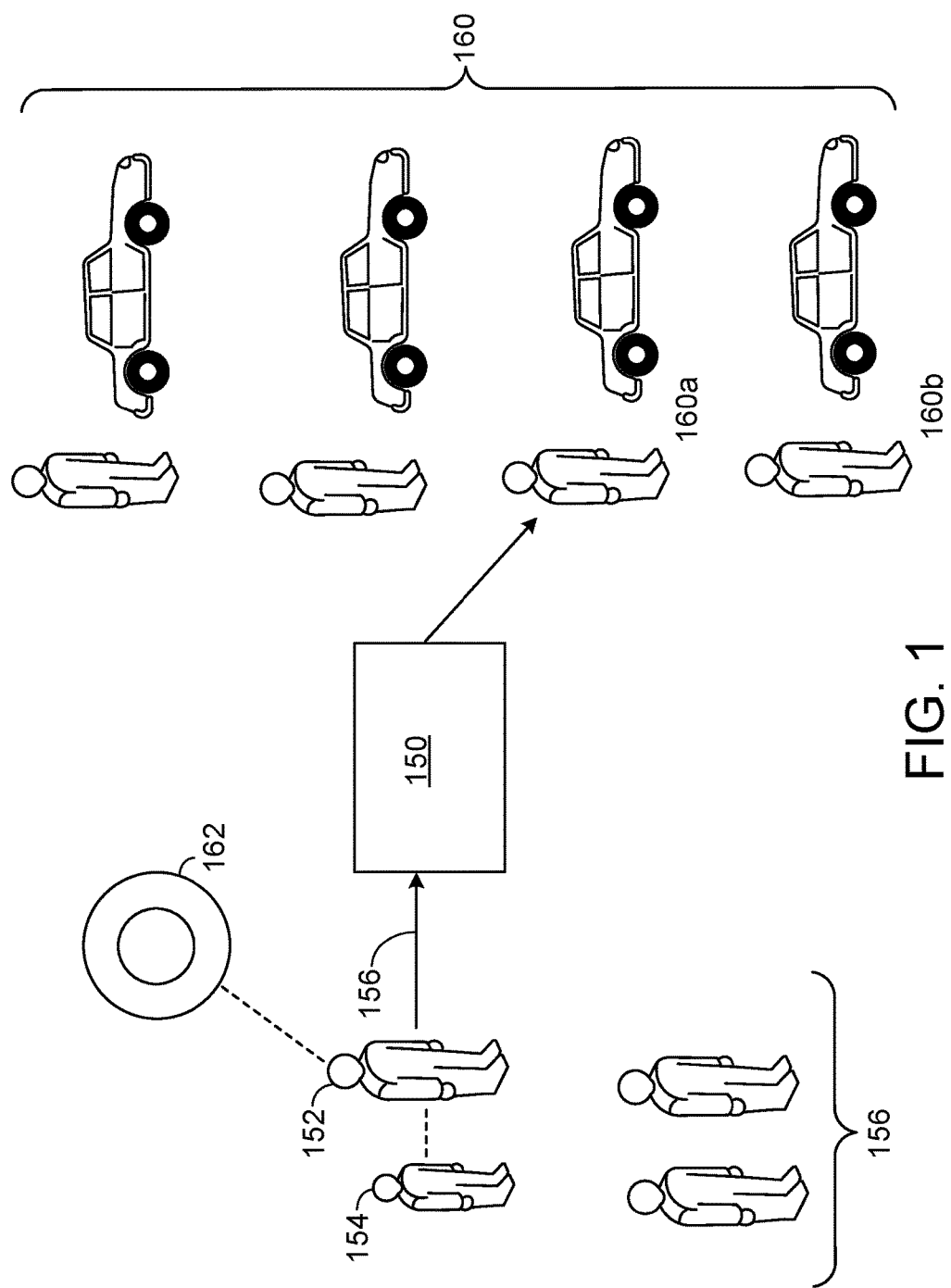
FIG. 1 is a diagram of an on-demand and scheduling service system.

Referring to FIG. 1, an on-demand and scheduling service system 150 receives a request 156 for a ride from a user 152. In some examples, the user 152 requests the ride for himself; in some examples, the user 152 requests the ride on behalf of a rider 154. The request for a ride can include schedule information, such as the date and time of the ride; geographic information, such as a start location, a waypoint, and an end location; special requests, such as a request for a vehicle that can accommodate luggage; and/or other types of information.

Multiple drivers 160 are enrolled with the on-demand and scheduling service system 150. Responsive to receiving the user's request 156 for a ride, the on-demand and scheduling service system 150 selects a particular driver 160a from among the multiple drivers 160 and assigns that driver 160a to provide the ride for the user 152 or the rider 154. The on-demand and scheduling service system 150 can select the particular driver 160a from among the multiple drivers 160 based on an indication of the trust that the user 152 has for each of one or more of the drivers 160. For instance, the particular driver 160a selected by the on-demand and scheduling service system 150 for the user 152 can be the driver who is the most trusted by the user 152, based on one or more metrics of trust, such as based on a circle of trust for the user and/or based on a trust barometer value for the driver. In some examples, the on-demand and scheduling service system 150 can determine an indication of the trust that the user 152 has for each of the one or more drivers 160 upon receipt of the user's request 156 for a ride. In some examples, the indication of trust can be pre-determined and stored in a data storage associated with the on-demand and scheduling service system.

In some examples, the selected driver 160a is assigned to the user's requested ride automatically, e.g., without requesting confirmation from the driver 160a. In some examples, other factors are also taken into account when selecting and/or assigning the selected driver 160a to the ride, such as the driver's availability and/or receipt of confirmation from the driver. In some examples, the selection and assignment of the driver 160a can be performed automatically by the system 150, e.g., without input from the user 152 or the driver 160a-. In some examples, the selection of the driver 160a can be performed automatically but the assignment can be performed upon receipt of a confirmation from the driver 160a.

In some examples, the system 150 can select and/or assign a primary driver 160a and a back-up driver 160b for a ride. When a user 152 requests a ride, the system selects and assigns a primary driver, e.g., the driver that is the most trusted by the user, for this ride. Another driver, such as the second most trusted driver, can be automatically assigned as the back-up driver for that ride. The user can be informed about the primary driver and the back-up driver through the user interface of the mobile computing device, and information about the primary driver and the back-up driver can be shared with the user through the user interface. If the primary driver assigned to the user for his requested ride is unavailable, e.g., not able to pick the user up on time, then the back-up driver is assigned to the ride and sent to the user's pick-up location.

The determination of the indication of trust that a user has for a particular driver can be based on one or more factors, such as historical, geographic, interpersonal, social, personal, or behavioral factors, or other factors. Data representative of one or more of these factors can be obtained based on one or more trust related activities such as background checks, meeting a mentor, interviews, or collection and/or verification of personal information or documentation, or other activities. In some cases, data representative of one or more these factors can be collected directly from drivers, e.g., during a driver enrollment process or during an occasional update process. In some cases, data representative of one or more of these factors can be collected or determined based on the driver's performance, e.g., as the driver provides rides to riders.

In some examples, the level of trust that the user 152 has for each of multiple drivers 160 can be defined with reference to multiple layers, such as two layers, three layers, or more than three layers. These layers are collectively called a "circle of trust" 162. The circle of trust 162 is specific to a particular user 152 and indicates the level of trust that that particular user 152 has for each of one or more of the multiple drivers 160. Each layer of the circle of trust 162 represents a defined level of trust which is different from the level of trust represented by each other layer of the circle of trust 162. To create the circle of trust 162 for a particular user 152, the on-demand and scheduling service system 150 determines a level of trust the user 152 has for each of one or more of the drivers 160 according to one or more rules governing the determination of trust and based on data representative of one or more of the above mentioned factors. The system 150 places each of those drivers 160 in the layer of the user's circle of trust 162 that matches the determined level of trust for the driver 160. One or more of the factors can be dynamically determined, e.g., periodically, upon receipt of new data about a driver, upon receipt of the user's request 156 for a ride, upon receipt of a request from the user to re-determine a level of trust for a driver, or for another reason, and hence the placement of a driver in the circle of trust of a user can change.

In some examples, the user 152 can add a driver to his/her circle of trust 162 manually. For instance, if the user knows a driver personally (e.g., if the driver is the user's friend or if the driver is a neighbor whom the user trusts), the user can manually add that driver into the user's circle of trust.

Figure 2:
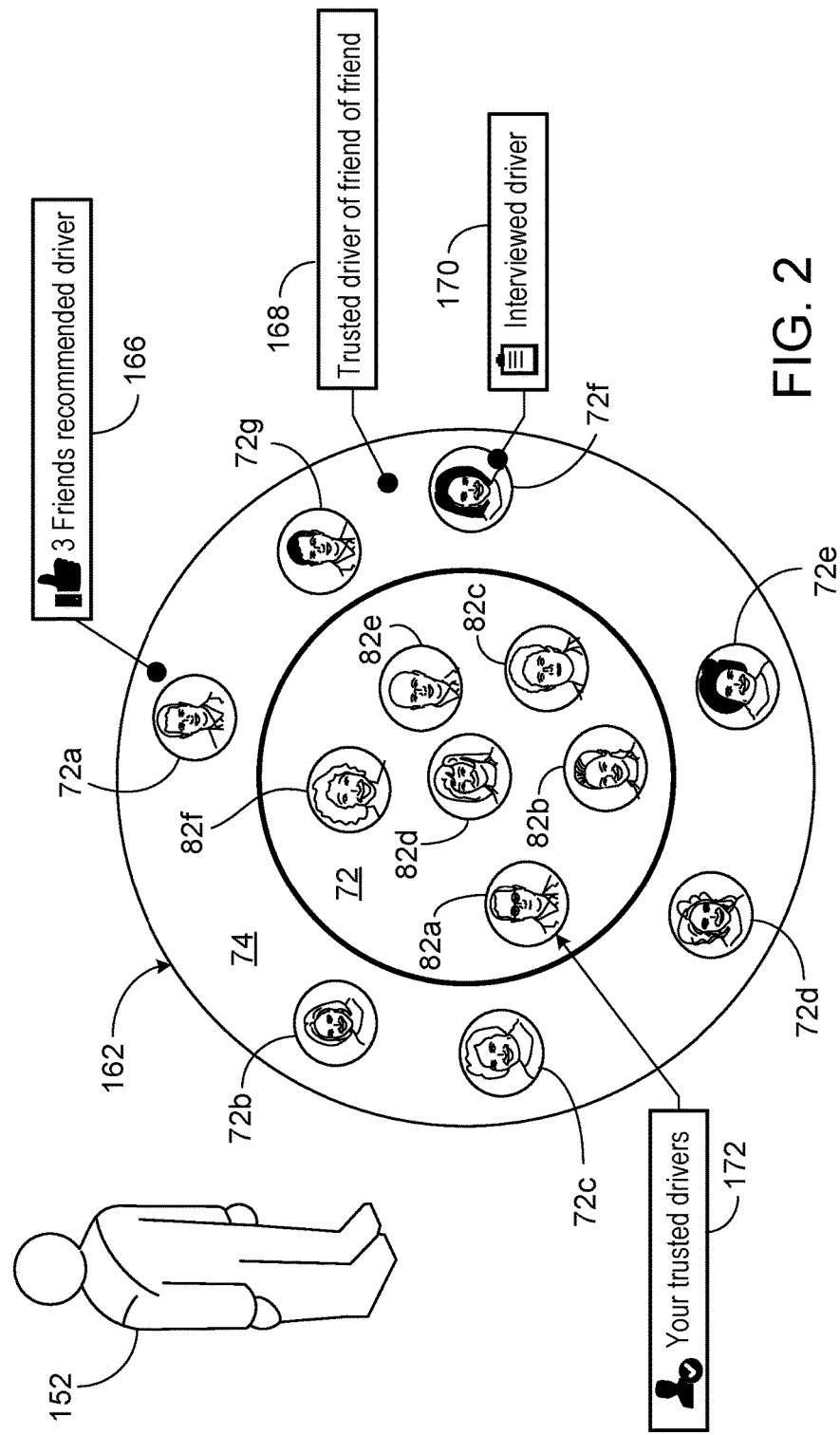
FIG. 2 is a diagram of a circle of trust.
Figure 3:
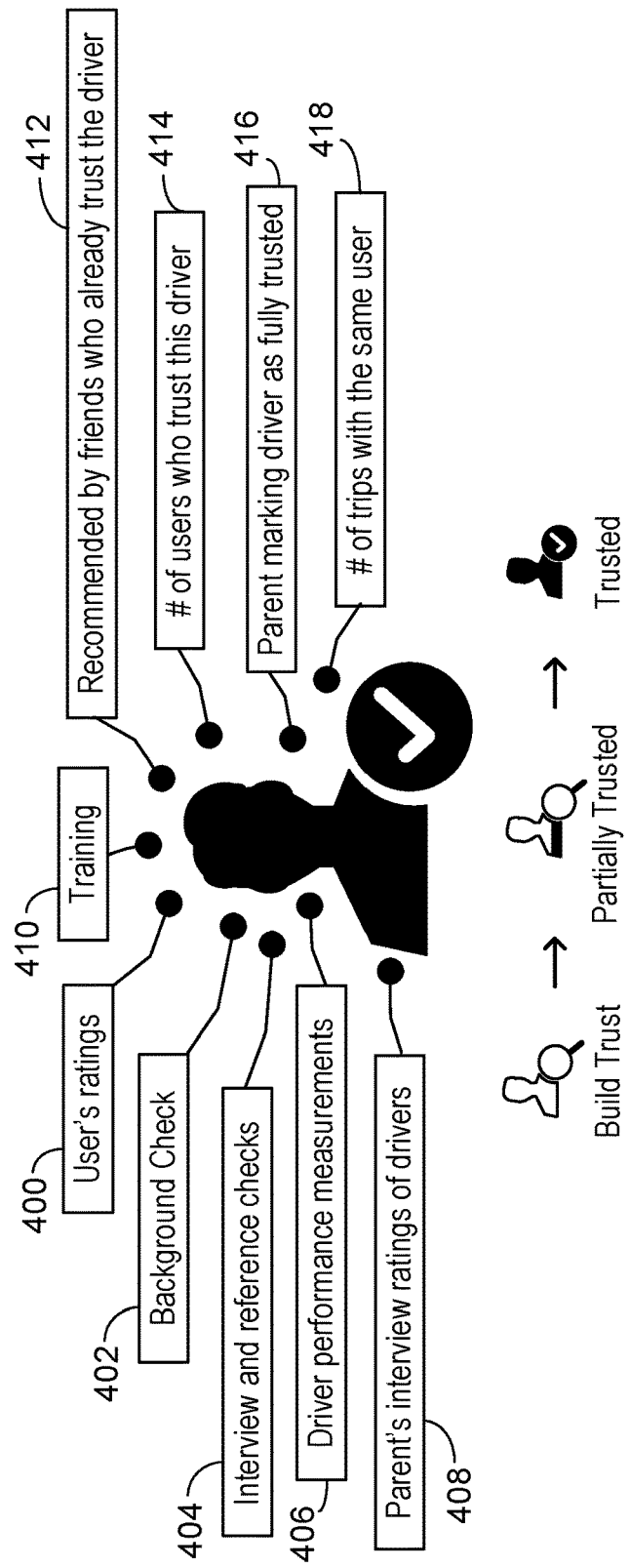
FIG. 3 is a diagram of a trust barometer.

Referring to FIG. 2, an example of the circle of trust 162 for the user 152 includes two layers: an inner layer 74 and an outer layer 76. In some examples, the circle of trust 72 can have more than two layers, such as three layers or more than three layers. The inner layer 74 of the user's circle of trust 162 represents a high level of trust and includes drivers who are most trusted by the user 152. In some examples, the inner layer 74 represents drivers having a level of trust above a certain threshold. In some examples, the inner layer represents a top percentile of trusted drivers, such as the top 5%, 10%, 20%, or another percentile. In the example of FIG. 3, drivers 82a, 82b, 82c, 82d, 82e, and 82f are included in the inner layer 74 of the circle of trust 162. The outer layer 76 of the user's circle of trust 162 represents a level of trust that is lower than that represented by the inner layer 74, such as a level of trust that is below the threshold for the inner layer 74 but above a minimum threshold or a mid-range percentile. In the example of FIG. 3, drivers 78a . . . 78g, for whom the user 152 has a lower level of trust than the drivers 82a . . . 82f, are included in the outer layer 76. Drivers for whom the user 152 has an extremely low level of trust (e.g., a level of trust below the minimum threshold or in a very low percentile) or for whom no data are available are not included on the user's circle of trust 162.

When the user 152 requests a ride, a driver can be automatically selected for the user's requested ride based on the driver's position within the user's circle of trust 162 according to one or more rules governing driver selection. The drivers 82a . . . 82f in the inner layer 74 of the user's circle of trust 162 can be prioritized for selection. For instance, the system 150 can attempt to select and assign each of the drivers 82a . . . 82f for the user's requested ride, and can attempt to select and assign the drivers 78a . . . 78g in the outer layer 76 for the user's requested ride only if none of the drivers 82a . . . 82f is available.

In an example, the most trusted driver as indicated by the driver's position within the circle of trust 162 of the user 152 can be selected for the user's requested ride. If the most trusted driver is not available for the requested ride, then the system can automatically select a back-up driver, such as the second most trusted driver, for the user's requested ride. If the backup driver is available, that driver is assigned to the user's requested ride. In some cases, two or more drivers can have an equivalent position within the user's circle of trust 162, and a particular driver can be selected at random or based on other criteria (e.g., seniority; number of rides completed that day, week, or other period of time; or other criteria). If the selected driver is not available, another one of the drivers at the same position within the user's circle of trust 162 can be selected, e.g., at random or based on other criteria.

In some examples, the drivers 82a . . . 82f in the user's inner circle of trust 74 can be eligible for selection responsive to a request for a ride for which other drivers are not eligible, such as rides late at night, rides in isolated locations, rides for children or dependents of the user, and so forth. Drivers 78a . . . 78g can be eligible for receiving requests for rides that unknown drivers or drivers with no trust rating are not eligible to receive. However, drivers 78a . . . 78g can be restricted from receiving requests for some rides receivable by drivers 82a . . . 82f. The trusted drivers of a user can be seen in a special tab of the application, such as a "My Trusted" tab 80.

In some examples, a trust barometer can be used as a representation of the trust the user 152 has for a driver 160, and a driver can be selected responsive to a user's request for a ride based on the driver's trust barometer value. A trust barometer for a driver represents the trust that multiple users collectively have for that driver and is based on one or more factors which can include historical, geographical, interpersonal, social, personal, or behavioral factors, or other factors. A driver is assigned a trust barometer value based on input from one or more users of the system, such as feedback, ratings, reviews, or other information about the driver received from users, e.g., during or after the users' requested rides. for instance, user input can relate to how a driver handles her rides, such as her discipline, punctuality, respect, ability to carry out prompt and accurate actions, occurrence of sudden accelerations, whether she makes or takes phone calls or sends or receives text messages during the ride, or other driver behaviors. As the driver takes more and more rides, the trust barometer value may change, e.g., as additional feedback is received about the driver from more and more users.

In some examples, the trust barometer value for a driver can be generic across all users, e.g., a driver can have the same trust barometer value for all users. In some examples, the trust barometer value can be specific to both a driver and a user. For instance, if a user (e.g., the user 152) is associated with one or more other users 156, feedback, ratings, or reviews about a driver from the one or more other users 156 can be more heavily weighted than information from other users with whom the user 152 is not associated when determining the trust barometer of the driver for the user 152. For example, a social graph can be used to determine or confirm associations or relationships among users. A trust barometer value can be weighted based on the proximity of a user to another user who provided a trust rating of the driver. As such, a driver might have a trust barometer indicative of a high trusted rating in one group of users but a poor trust rating for another group of users. The weights for adjusting the trust barometer based on the feedback, ratings, and reviews of users can be defined by the application rules 22. The trust barometer value can be calculated dynamically and can change over period of time.

Referring to FIG. 3, in an example, a driver's trust barometer value for a particular user is determined based on both information that is specific to the particular user and information that is generic across multiple users, such as users with whom the particular user is linked via a social network. For instance, the driver's trust barometer value can be determined based on the user's ratings of the driver 400, the driver's background check 402, the driver's interviews and reference checks 404, performance measurements for the driver 406, the user's interview ratings of the driver 408, the driver's training 410, the extent to which the driver is recommended by friends of the user 412, the number of users who trust the driver 414, the user marking the driver as fully trusted 416, and the number of trips the driver has taken with or for the user 418.

In some examples, the trust barometer value has multiple discrete levels, such as an untrusted level, a moderate level in which the user is starting to build trust for the driver, and a fully trusted level in which the user has enough information about and experience with the driver to fully trust him or her.

The trust that a user has for a driver is defined according to one or more rules implemented by the on-demand and scheduling service system 150 that take into account the driver's position within the user's circle of trust 162 and/or the driver's trust barometer value. In some examples, the trust a user has for a driver can be defined by a combination of the driver's trust barometer value, and the driver's position within the user's circle of trust; in some examples, the trust a user has for a driver can be defined by only one of the driver's position within the user's circle of trust and the driver's trust barometer value.

Figure 4:
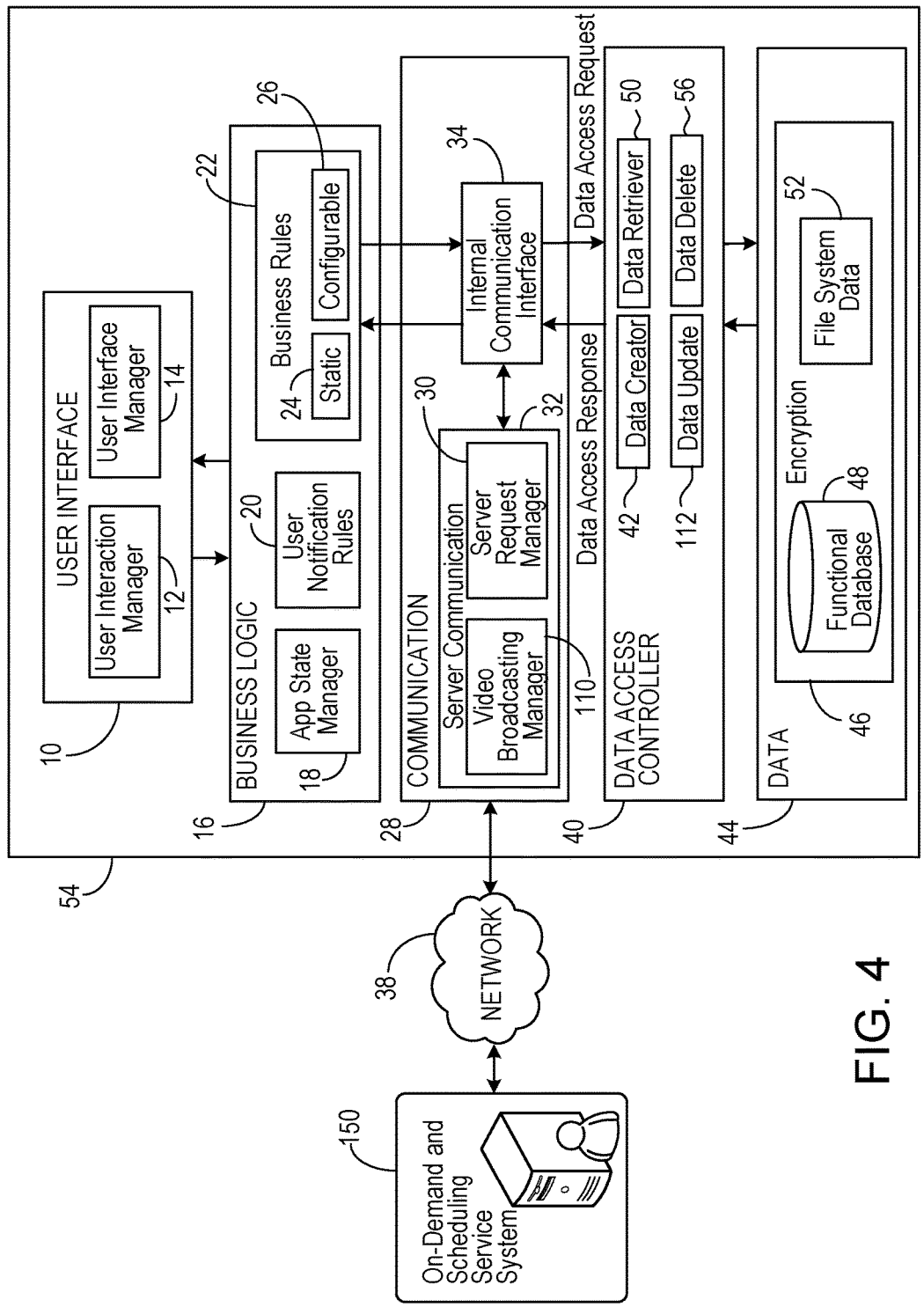
FIG. 4 is a diagram of an on-demand and scheduling service system.

FIG. 4 shows a diagram of an example of the on-demand and scheduling service system 150. The on-demand and scheduling service system 150 includes a client device 54. The client device 54 can be one or more of a user's device, driver's device, rider's device, third-party user's device, and so forth. In some examples, the user is the rider. In some examples, the user is the third-party user, such as a requestor of the ride that is neither the rider nor the driver. The on-demand and scheduling service system 150 includes an on-demand and scheduling service system server 35. The server 35 can be a remote computing device for storing data, performing calculations, managing rulesets associated with each user, rider, and driver of the system 150, and other similar functions. Determinations of the system, such as those made by the application logic 16, can be performed either client-side, server-side, or both. The server 35 and the client device 54 communicate over a wireless network 38, such as a cellular network, the Internet, and so forth.

Each of the server 35 and the client device 54 of the system 150 can include an application logic device 16, 17, a communication module 28, 29, a data access controller 40, 41, and a data handling module 44, 45. For example, when the client device 54 receives input though a user interface 10 of the client device 54, the communication module 28 can send the instructions for processing server-side by the application logic 17 of the server 35, or the instructions can be parsed and processed by the application logic 16 of the client device 54.

Each of the server 35 and the client device 54 of the system 150 include application logic devices 16, 17. The application logic devices 16, 17 include data processors for managing instructions of the application, determining the application state, processing inputs to the application from the user, and fetching or obtaining application rules for determining functionality of the application of the system 150. In some examples, the application of the system 150 is a program running on the client device 54 and/or the server 35 for performing the functions described herein.

The application logic devices 16, 17 each includes a corresponding app state manager 18, 19, a user notification rules module 20, 21, and an application rules module 22, 23. The app state managers 18, 19 monitor and control the state of the corresponding application, which can determine content of a response sent by the application in response to input by the user or data received by the application. The user notification rules modules 20, 21 determine when notifications, such as alerts, SMS messages, emails, alarms, push notifications, etc. are sent to the user. The application rules modules determine which rules are applied during operation of the application as described in further detail below. The application rules engine includes rulesets that are both static, such as static rules 24, 25, and configurable by a user, such as configurable rules 26, 27.

The application rules engine communicates with the internal communication interface 36, 37. The internal communication interface 36, 37 manages requests and responses from various modules of the server 35 or client device 54 of the system 150. For example, when data is requested from the functional database 48, 49, the internal communication interface 37, 38 can send a request for the data, receive the data in response, and route the data to the appropriate requesting module.

The communications module 28, 29 includes either a client communication module 31 or a sever communication module 30 for the server 35 and client device 54, respectively. The client communication module 31 includes a client request manager 33 for handling (e.g., queueing, parsing, etc.) requests from the client device 54. The server communication module 30 includes a server request manager 32 for handling (e.g., queueing, parsing, etc.) requests from the server 35.

Video broadcasting managers 110, 111 use the data retriever components 50, 51 of the data access controller 40, 41 to broadcast live video of a rider according to application rules 22, 23. Data creator components 42, 43 are used to store this video data in the functional database 48 of the on-demand and scheduling service system 150. Data update modules 112, 113 and data delete modules 55, 56, can be used for managing, updating, deleting, and maintaining data of the data module 44, 45, such as according to application rules 22, 23.

The data module 44, 45 stores and organizes data of the server 35 and client device 54 as required by the application rules 22, 23. For example, data for users can be stored in the function database 48, 49, such as demographic data of users, riders, etc. User preferences can be stored, such as preferred routes, no-go zones, geo-fences, a trusted driver list for that user, an image of the user, saved pickup instructions, and so forth. The data module 44, 45 also handles file system data 52, 53 required for running the application, such as system files and the like.

The client device 54 includes a user interface 10. The user interface 10 can be a touch screen, display, monitor, and so forth. The user can input commands via the user interface and otherwise interact with the application of the system 150 using the user interface 10. The user interaction manager 12 and user interface manager 14 are described in greater detail below.

The user (e.g., a customer or requestor) as described here refers to an individual who makes a service request to the on-demand and scheduling service system 150. The service provider can be an individual or entity that can provide the service requested by user. The service receiver can be an individual to whom the requested services are provided. A user or customer, using a customer device, can request an on-demand or scheduling service which can be a transport service, a telegram service, food delivery service, or a messenger service. The on-demand and scheduling service system 150 can communicate with the service providers using the provider devices and arrange for them to provide the requested service.

A driver can be selected and assigned to a certain user based on the level of trust that the user has for the driver. A user sends a request for a ride to an engine using the client device 54, such as a mobile computing device. The user can input the request to the computing device by using a touch-based interface, a keyboard, a mouse, a voice responsive interface, or other user input mechanisms. The input is received by the user interaction manager 12. The user can give one or more inputs before sending this request, such as input indicative of a pick-up location, a destination, a desired pickup or arrival time, a special request (e.g., a vehicle large enough to fit luggage), or other input. The user input is converted into data for sending to the engine. Some of the data sent to the engine are dependent on user input. Some information can be retrieved from the device that the user is using, such as stored information about user preferences, a default pickup location or destination, or other information. Some information can be retrieved from the functional database 48, which is a data structure that can be hosted on the user's device, on a central system server, on a cloud-based server, or in another location. The request for ride is sent out of the user's computing device through the network 38 interface of the user's computing device.

The on-demand and scheduling service system 150 receives the request sent from the user's client device 54. For instance, the request can be generated by the user via user interface 10 and passed on to the application logic 16 component (described below). The request can then be communicated to the on-demand and scheduling service system 150 by communication 28 component and the on-demand and scheduling service system 150 can respond to the client device 54. Along with this request there is some data related to the request. Other than the data sent by the user's client device 54, some data may already be present in the on-demand and scheduling service system 150, such as historical data, geographical data, social data, personal data, behavioral data, or other types of data.

Upon receipt of the request from the user, the on-demand and scheduling service system 150 can verify data related to the requested ride. For example, the on-demand and scheduling service system 150 verifies whom this ride request is made for, the pick-up and drop-off location, the time of ride, such as whether it is requested for now or scheduled for a later time, and that only one ride request is made at one time. Once this verification is done by the on-demand and scheduling service system 150, a response to the ride request is sent to the user's client device 54. For instance, the communication component 28 passes the response to the ride request from the on-demand and scheduling service system 150 to the user interface manager 14 according to one or more rules 22. The user interface manager 14 enables the notification to be provided to the user that the ride request has been accepted.

In some examples, using the data that was sent to the on-demand and scheduling service system 150 from the user's client device 54 and the data that is already present in the on demand and scheduling service system 150, the engine can determine trust-related data in real-time. In some examples, previously determined trust-related data can be used. In some examples, the trust-related data can be stored in the on-demand and scheduling service system 150 and as pre-calculated trust related data to reduce computation time of subsequent requests for rides from the user.

To determine trust-related data, e.g., responsive to a user's request for a ride, data for one or more drivers are retrieved from a functional database 48 by the data retriever 50 component of a data access controller 40. A server request manager 32 then sends these data to the on-demand and scheduling service system 150 through a network 38 which retrieves historical, behavioral, interpersonal, social, geographical, personal, or other factor data from the functional database 48 through the data access controller 40. Based on these data, the on-demand and scheduling service system 150 determines an indication the trust the user has for each of the drivers according to rules governing trust determination, as discussed below. In some examples, the indication of trust is predetermined and retrieved responsive to receiving the user's request for ride.

Based on the determined indication of the trust a user has for each of one or more drivers, the on-demand and scheduling service system 150 selects a driver to provide the ride requested by the user. For instance, the on-demand and scheduling service system 150 can select the driver having the highest indication of trust. In some examples, the indication of the trust a user has for a driver is represented by the driver's position within the user's circle of trust. In some examples, the indication of the trust the user has for a driver is represented by the driver's trust barometer value, which can be a generic value for all users or can be specific to the particular user. In some examples, the indication of the trust the user has for a driver is represented by a combination of the driver's position within the user's circle of trust and the driver's trust barometer value.

The selected driver is informed of his selection as a driver for the user's requested ride and asked to confirm, e.g., based on his availability, current geographical location, or desire to provide the ride. When the selected driver confirms, he is assigned to provide the ride and the user is informed. In some examples, the user can be provided with information about the assigned driver, such as the driver's name, profile picture, vehicle information, ratings, or other information. In some examples, the user can be provided with an estimated time at which the driver will arrive at the pickup location.

The driver can be placed into the user's circle of trust and/or can be assigned a trust barometer value according to one or more rules governing trust determination and implemented by the on-demand and scheduling service system 150. The rules can reflect one or more factors indicative of trust. These factors can include, e.g., the user's previous ride experiences with the driver or with other drivers having similar or different characteristics as the driver, whether the driver lives or is currently located nearby the user, whether the driver is a friend of the user or recommended by a friend of the user, the driver's interview with the user or with a friend of the user, the driver's background checks, reference checks, DMV checks, car insurance verification, or training, or other information. The driver's overall behavior in earlier rides with the same user can also be used in the determination of how much the user trusts the driver. For instance, the way the driver has handled previous rides, the driver's discipline, the driver's punctuality, the driver's respect, the driver's prompt and accurate actions, or other indications of the driver's previous behavior can play a role in the determination of user's trust for the driver.

Some of the data used in the determination of an indication of the trust a user has for a driver, such as data related to a driver, is collected from the driver directly. Some of the data used in the determination of trust evolves as the driver takes more and more rides. Initial data is collected from the driver when the driver registers with the service. Personal data about the driver, the user, or both can be kept in the on-demand and scheduling service system 150 and the personal data is not shared with the driver's client device 54. Data used for the determination of trust is made available for the engine to consume for determination of some other values which would be used in the process of automatic driver assignment. Some of this data is present within the functional database 48. Some of the data is present in the database of on-demand and scheduling service system 150. The part of data that is present in the functional database 48 is communicated to the on-demand and scheduling service system 150 by the server communication 32 component.

Some of the data used in the determination of an indication of the trust a user has for a driver can be obtained by completion of one or more trust-related activities, such as background checks or other types of screening, training, interviews, collection and verification of personal information or documentation, or other activities. Drivers can be screened through background checks like federal, county, or multi-state criminal record checks. Personal information or documentation, such as driver's license details, motor vehicle records, insurance details, social security number, or other driver information can be collected and/or verified.

An indication of the trust a user has for a driver is determined according to rules implemented by the on-demand and scheduling service system 150 based on the outcome of one or more of the trust-related activities described above, the factors described above, or both. In some examples, one or more of the factors can be dynamically calculated and/or one or more of the trust-related activities can be repeated, and hence the indication of the trust a user has for a driver can change.

In some examples, the indication of trust a user has for a driver is used to position the driver at an appropriate level in the user's circle of trust. In some examples, the indication of trust is used to assign a trust barometer value to the driver. When the on-demand and scheduling service system 150 positions a driver in a layer of the user's circle of trust and/or assigns a trust barometer value to the driver, a server request manager 32 then sends the data to a data update 112 component which updates the previous data related to user trust for that driver, the driver's position in the user's circle of trust, and/or the trust barometer value of the driver for that user. This updated data is stored in the functional database 48 and can be used in the automatic selection and assignment of the driver for the user's future ride requests.

User interfaces of an application executed on a mobile device belonging to or operated by the user can provide the user with the ability to request a ride, view information about the driver assigned to the ride, provide input (e.g., feedback, ratings, or reviews) about the driver during or after the ride, provide information about the user's trust for a driver, or other functionality.

Figure 5:
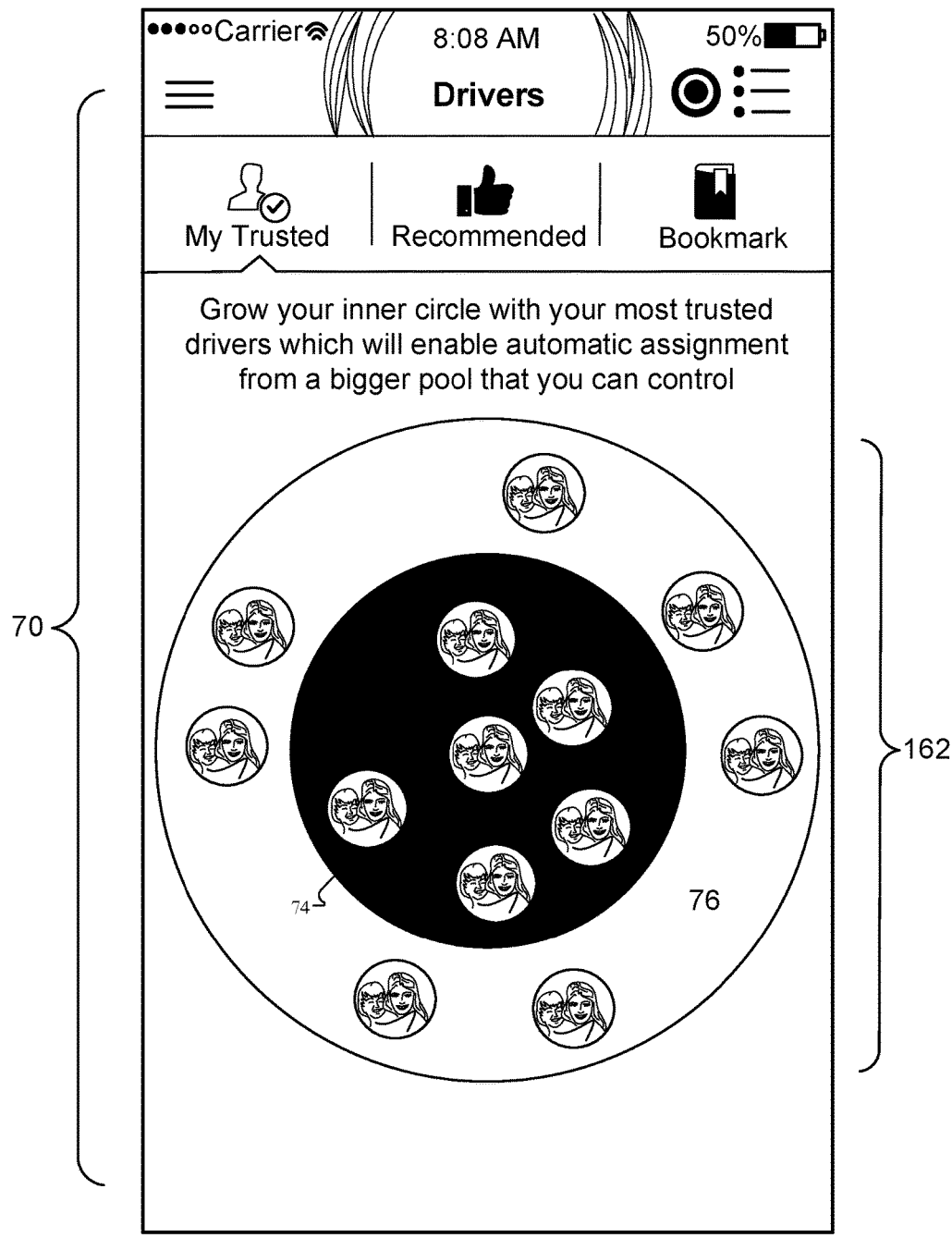
FIGS. 5-13 are diagrams of user interfaces.

Referring to FIG. 5, in some examples, the circle of trust 162 for a user can be displayed by the user interface manager in a user interface 70. The user interface 70 enables the user to visually see which drivers are positioned in each layer of the circle of trust and how many drivers there are in each layer of the circle of trust. For instance, the user may notice that he has few drivers in the inner layer 74 of the circle of trust 162, and may attempt to increase the number of drivers in the inner layer 74 to have a larger pool of trusted drivers eligible to provide rides.

In some examples, the user interface 70 can be interactive, e.g., so that the user can manipulate his circle of trust 162. For instance, the user can drag an icon of a driver from one layer to another in circle of trust, e.g., to move a driver from the outer layer 76 to the inner layer 74. The user can select a driver icon to access additional information about the driver, such as the driver's name, photo, demographic information, ratings, or other information. Other interactions can also be possible.

Figure 6:
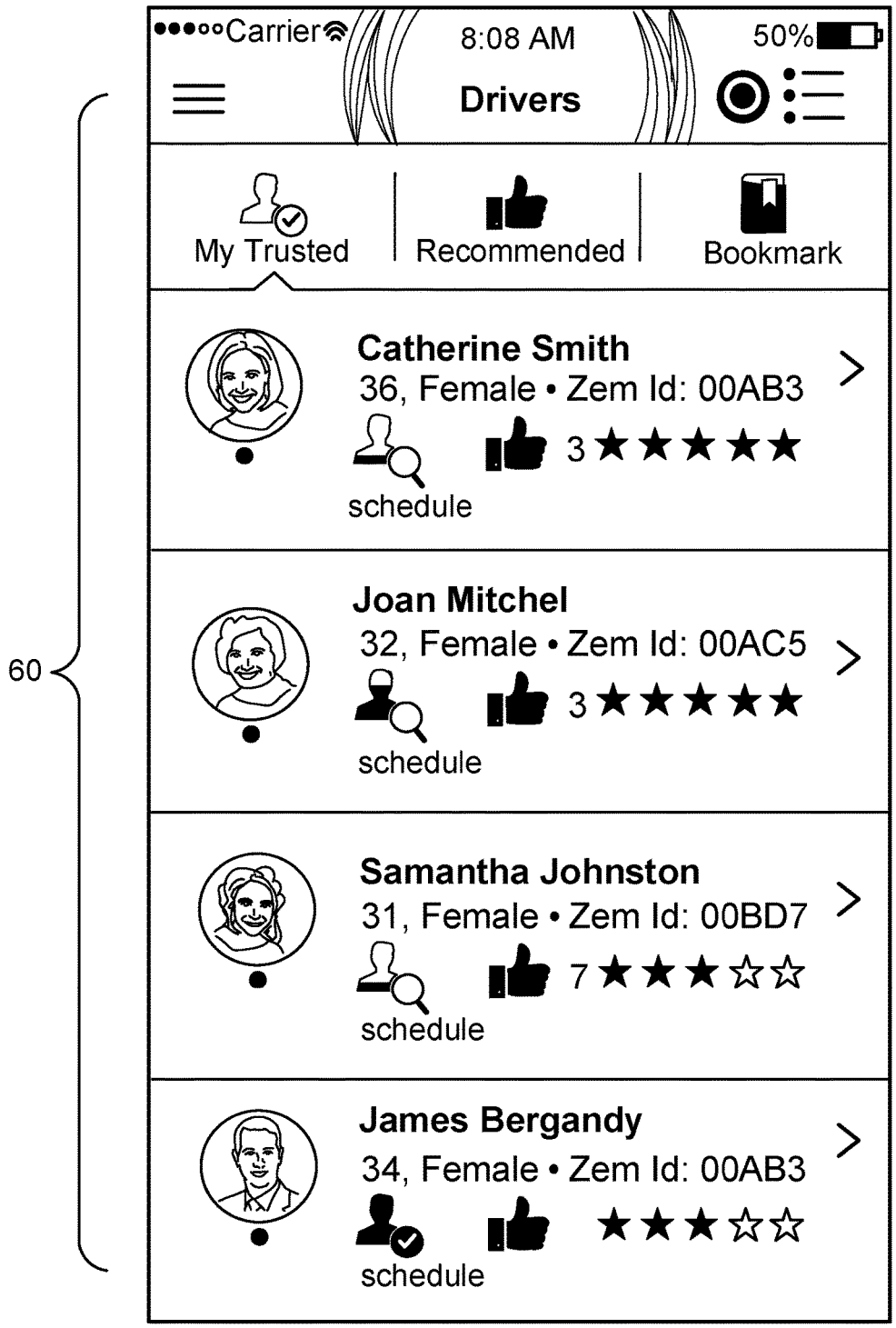

Referring to FIG. 6, in some examples, a list of trusted drivers 60 can be displayed by the user interface manager. The list of drivers can display information about each driver, such as the driver's name, photo, demographic information, ratings, or other information. Drivers can be displayed in the list in order of a trust ranking, e.g., ranked by an indication of the trust the user has for each driver, such as by their position in the user's circle of trust, by their trust barometer value, or by an indication of the trust the user has for each driver that is determined according to one or more rules and based on a combination of the drivers' positions in the user's circle of trust and the drivers' trust barometer values. In some examples, drivers can be displayed in order of other rankings, such as ranked by user ratings or by other metrics, such as frequency or number of past rides provided, indicators of past performance, and so forth. In some examples, drivers can be listed in random order, e.g., unranked. Drivers can be grouped in the list by one or more criteria, such as by driver demographics, geographical location, experience level, or other criteria.

Figure 7:
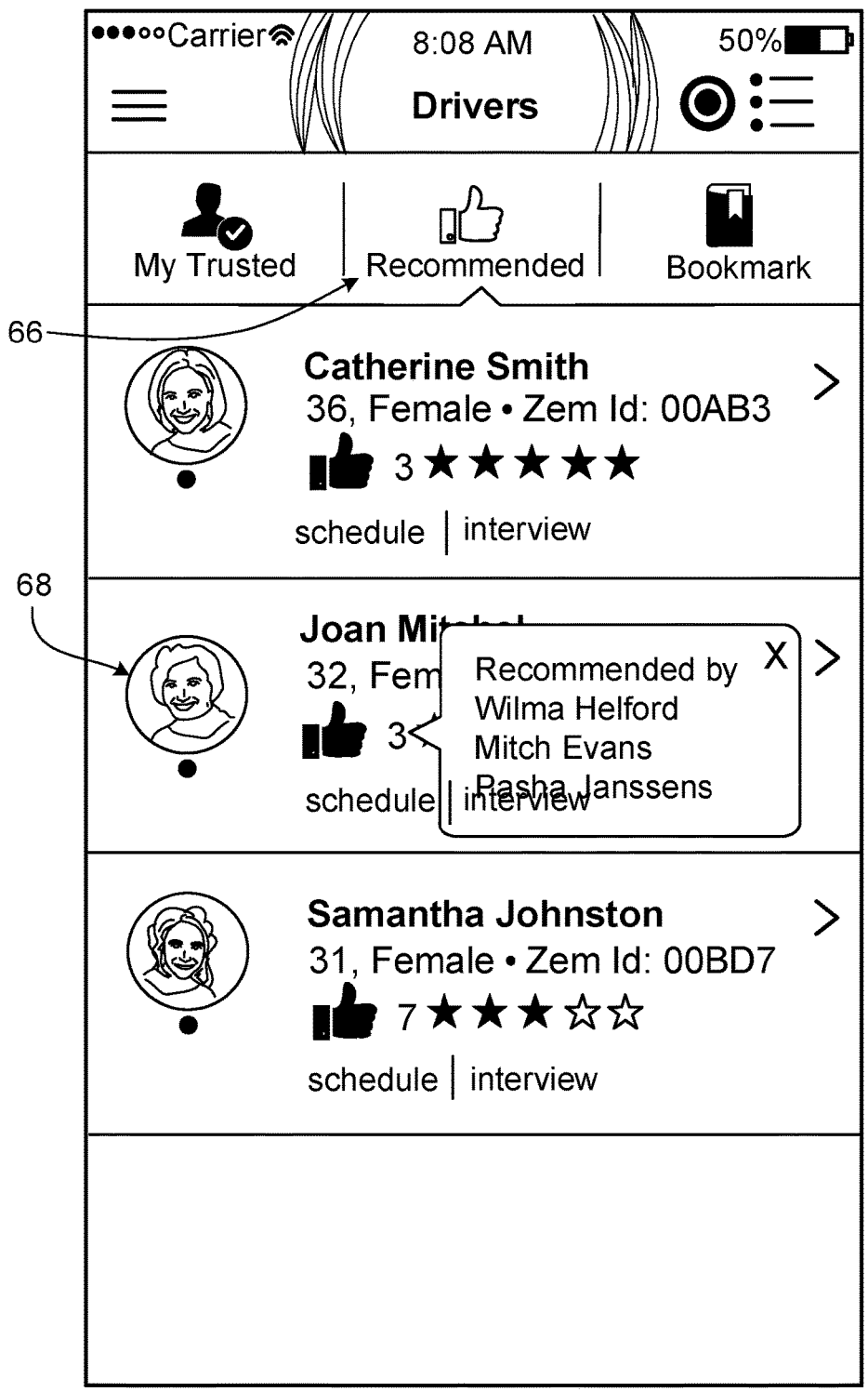

Referring to FIG. 7, a list of recommended drivers 66 can be displayed by the user interface manager. The list of recommended drivers can display information about each driver, such as the driver's name, photo, demographic information, ratings, or other information. The user can access additional information about the drivers on the list, for instance, by tapping a profile image 68 or other information about the driver. For instance, the user can view the names of other users who have recommended the driver, such as users with whom the user is associated (e.g., users with whom the user is linked in a social network) or unrelated users. In some examples, the user can interact with the list of recommended drivers 66, for instance, by marking a driver as a trusted driver, scheduling a ride with one of the drivers on the list of recommended drivers 66, or requesting an interview with one of the drivers.

When the user requests to access information about a driver otherwise interacts with the list of recommended drivers 66 (e.g., by tapping the profile image 68 for a particular driver), the user interaction manager 12 interacts with the internal communication interface 34 to retrieve the driver's data from the functional database 48. This request for data is processed according to rules 22 (described below), such as static or configurable rules. If the user is registered and genuine, data access controller 40 retrieves the driver's data from file system data 52 and driver profile is displayed to user in her client device 54 through user interface manager 14.

Figure 8:
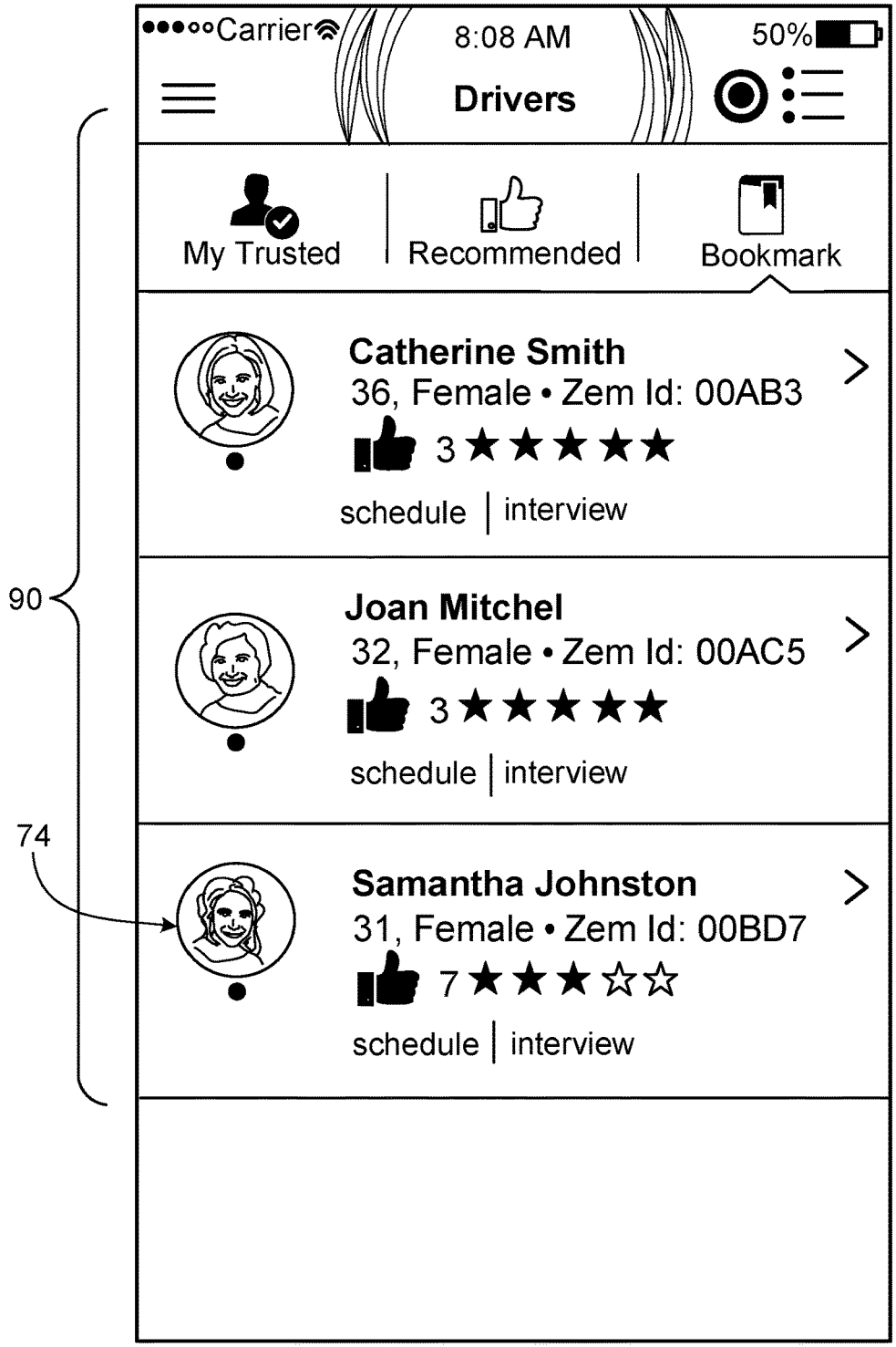

FIG. 8 shows an interface 90 including a list of bookmarked drivers. Bookmarked drivers are drivers whom the user would like to have easy access to, such as drivers who have provided satisfactory service to the user in the past. The list of bookmarked drivers can display information about each driver, such as the driver's name, photo, demographic information, ratings, or other information. The user can access additional information about the drivers on the list, for instance, by tapping a profile image 74 or other information about the driver. In some examples, the user can interact with the list of bookmarked drivers 90, for instance, by marking a driver as a trusted driver, scheduling a ride with one of the drivers on the list of bookmarked drivers 90, or requesting an interview with one of the drivers.

Figure 9:
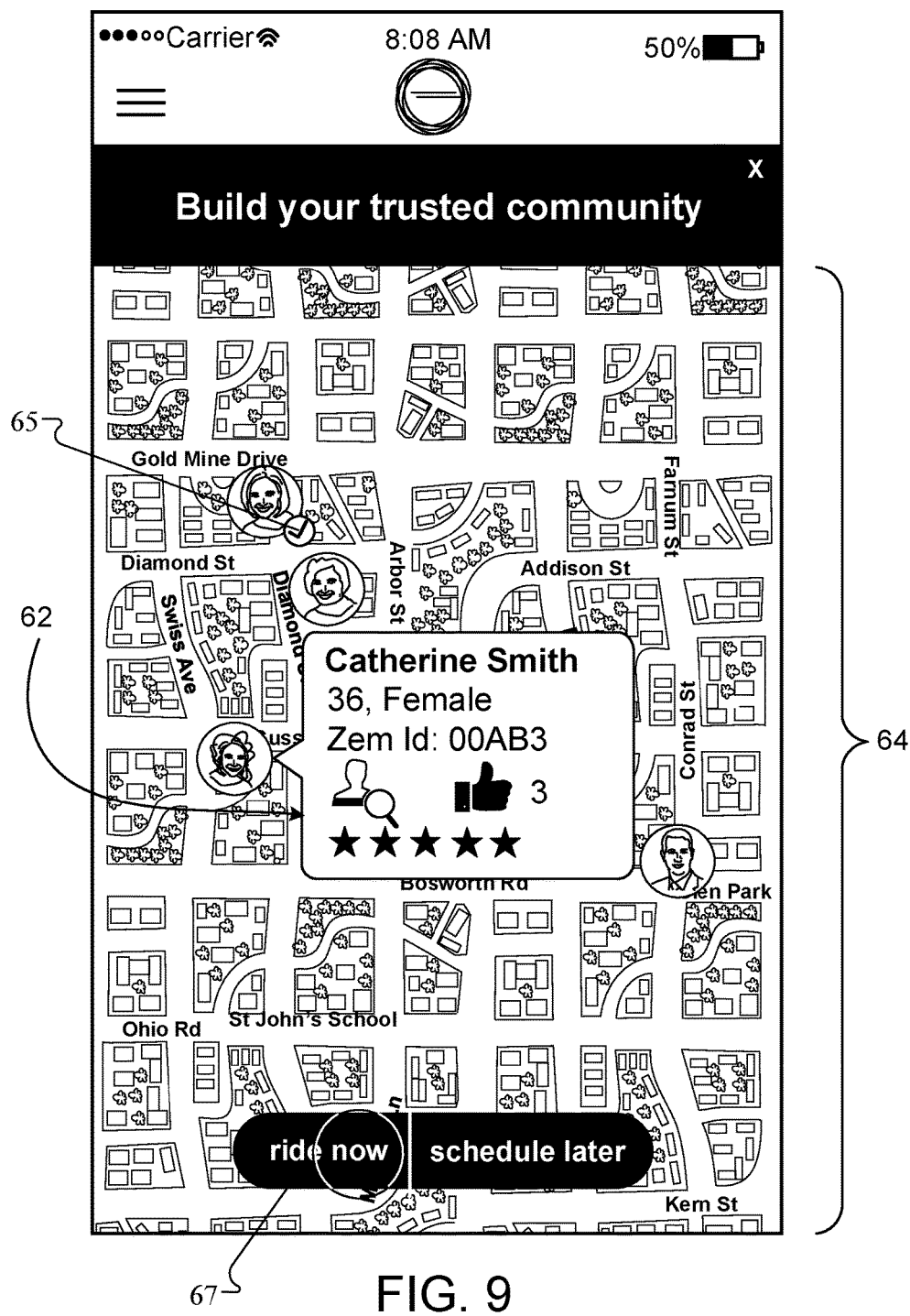

Referring to FIG. 9, a main map interface 64 displayed by the user interface manager enables the user to view the drivers presently in the vicinity of a particular location (e.g., near the location where the user would like to be picked up). In some examples, an indicator 65, such as a check mark, associated with a driver icon indicates that the driver is a trusted driver. The user can access a driver profile 62 for a driver from the main map 64 screen and access information about the driver, such as the driver's name, photo, demographic information, ratings, or other information. Through the driver profile, the user can also provide input about the driver, e.g., by rating or endorsing the driver, providing feedback about a previous ride, or providing other information about the driver.

Controls 67 can be used to schedule an immediate or future ride directly from the main map interface 64. In some examples, the user can manually one or more of the drivers visible on the main map interface 64 to his circle of trust so that those drivers can be selected for the user's requested ride. For instance, the user may choose to add a highly rated driver to his circle of trust because that driver is located on the same block as the user, and the user does not want to have to wait for the driver to arrive after requesting a ride.

Figure 10A:
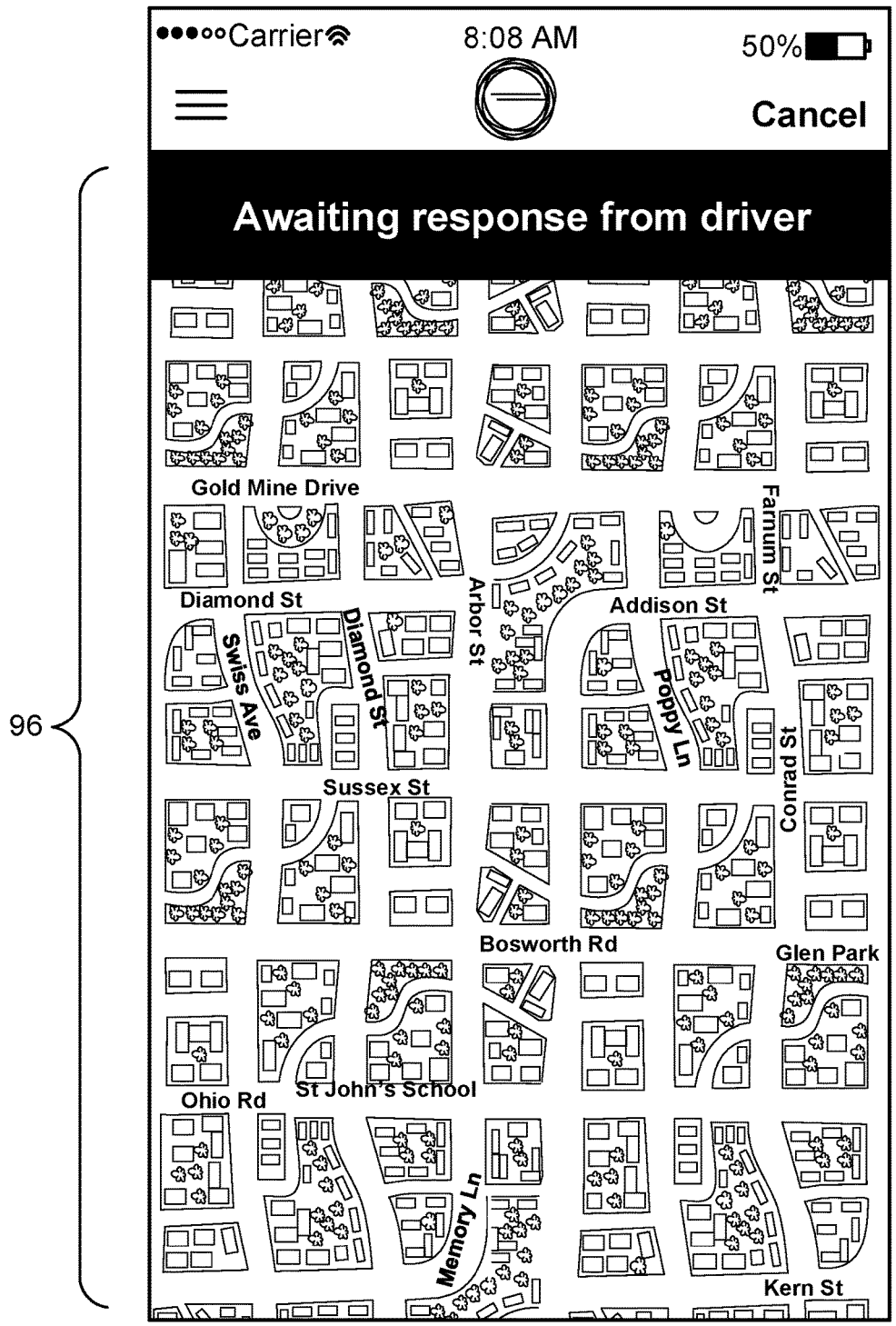
Figure 10B:
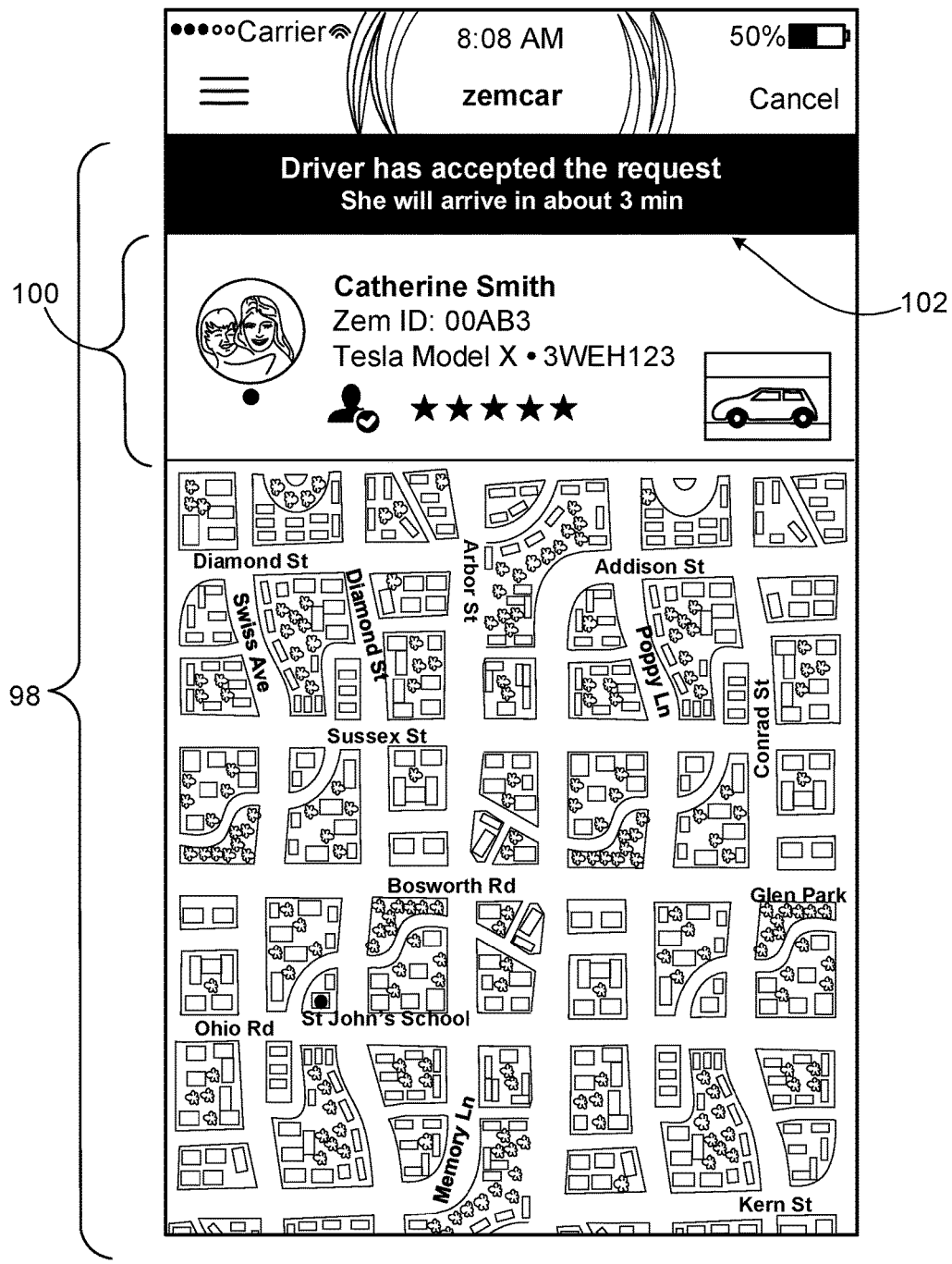

Referring to FIG. 10A, when the user requests a ride, the user is shown an interface 96 indicating that a driver has been selected and the system is awaiting a response from the driver before assigning the driver to the requested ride. Referring to FIG. 10B, when a driver has been assigned to the requested ride, the user is shown an interface 98 including information 100 about the assigned driver, such as the driver's name, profile picture, and/or other information. The user is also shown information about the driver's vehicle, such as a description of the vehicle, a photograph of the vehicle, the vehicle's license plate number, and/or other information. The user can be provided with an estimate 102 of when the driver is expected to arrive at the pick-up location. In some examples, the real time location of the driver can be tracked on a map so that the user can monitor the driver's progress.

Figure 11:
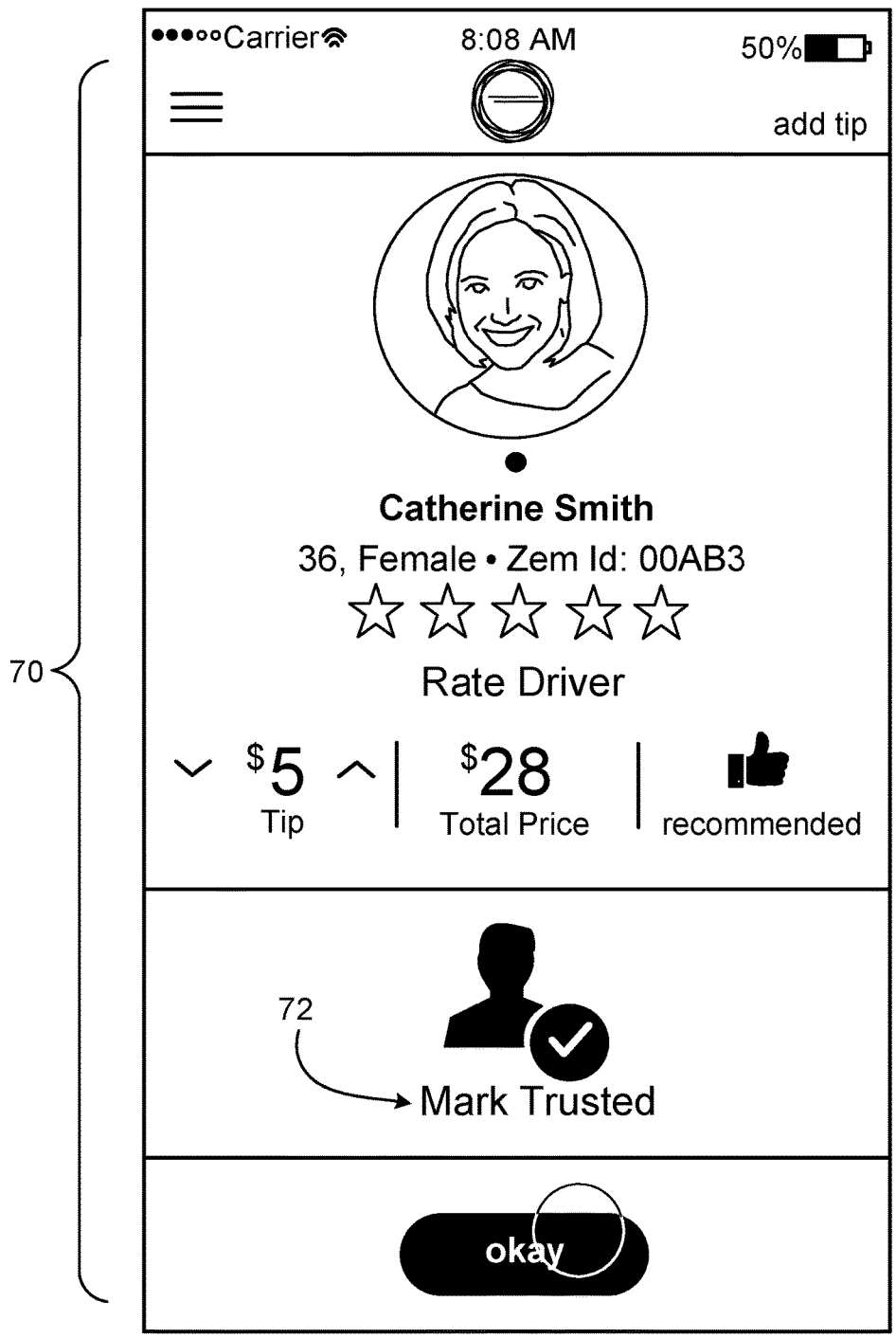

FIG. 11 shows a ride summary interface 70. The ride summary interface 70 displays information about the driver who provided the ride and other information about the ride, such as the cost, duration, or path of the ride. The user can provide a rating of the driver. The user can tap a trust icon 72 to add the driver to the user's circle of trust.

Figure 12:
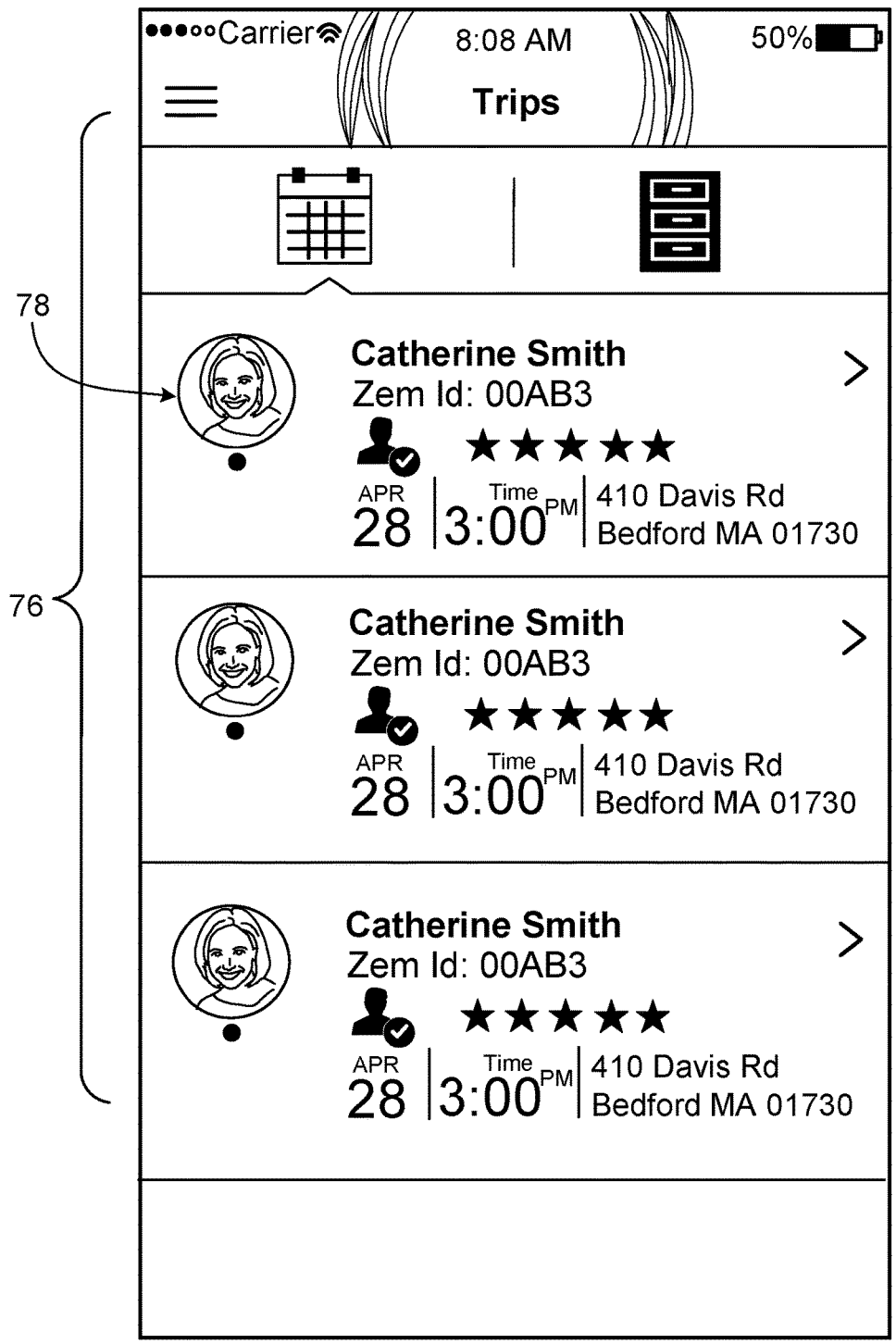

FIG. 12 shows an interface 76 including a list of completed and scheduled trips for a user. For each trip, brief information about the driver is provided, such as the driver's driver's name, photo, and ratings. Brief information about the trip can also be provided, such as the time and date of the trip, the duration of the trip, the pick-up and/or drop-off location, or other information. Through the interface 76, the user can access a driver's profile, provide ratings or feedback, and add the driver to the user's circle of trust. The user can select a particular trip from the list of completed and scheduled trips to access more detailed information about that trip.

Figure 13:
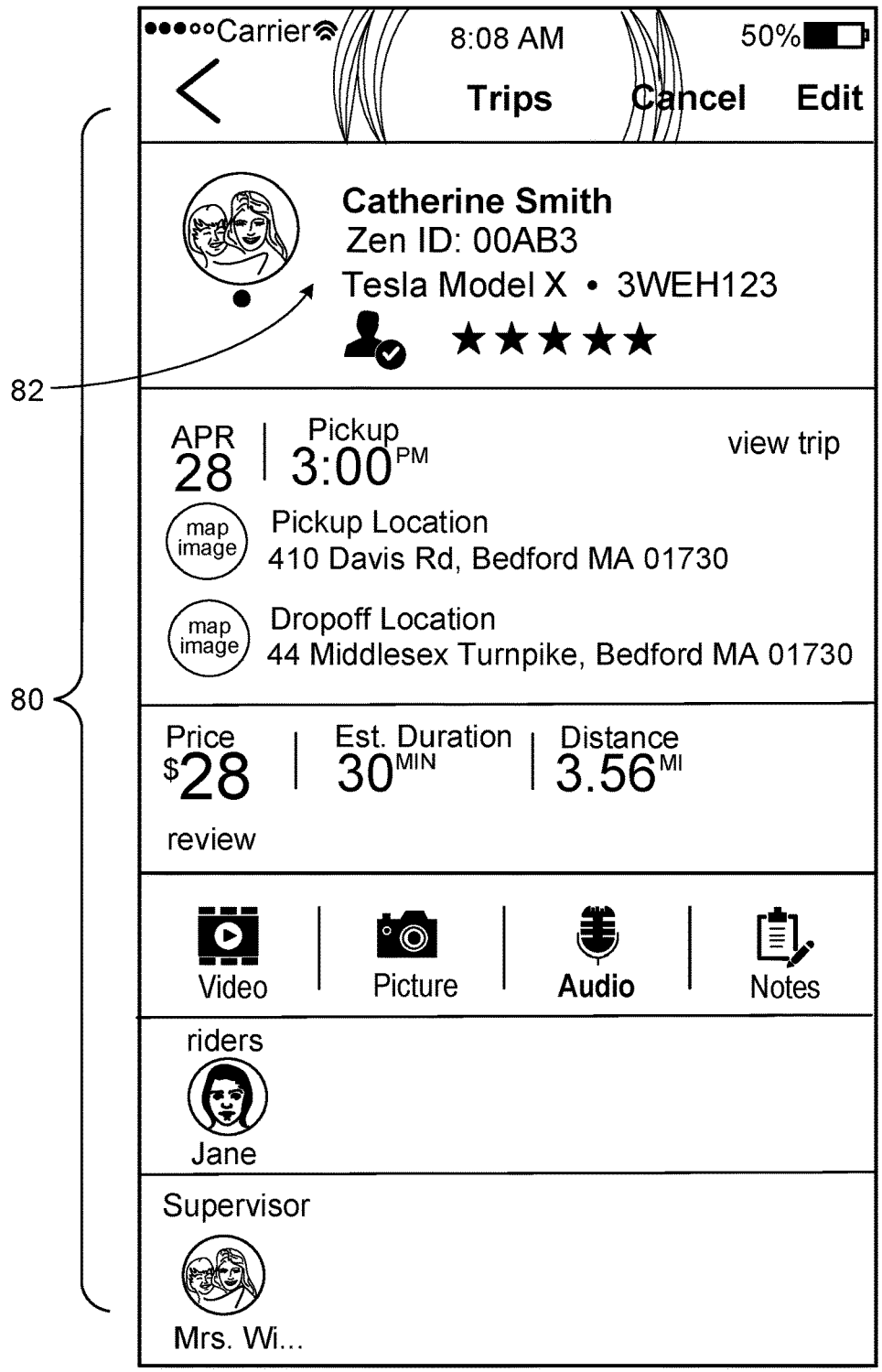

FIG. 13 shows a ride summary detail interface 80 for a completed or scheduled trip, e.g., accessed by selecting a particular trip from the list of trips 76 (FIG. 8). The ride summary detail interface 80 displays information about a particular trip, including information about the driver; information about the time, date, and/or location of the trip; information about the actual or estimated duration, cost, and/or distance of the trip; or other information. In some examples, media, such as audio, video, photographs, or notes, can be collected during the trip, and accessed during or after the trip from the ride summary detail interface 80. The ride summary detail interface 80 can also provide information about the rider or riders, the user, or other relevant parties. From the ride summary detail interface 80, the user can rate the driver, provide other feedback, or add the driver to the user's circle of trust.

Quick access to the details of completed trips, such as the details displayed in the ride summary detail interface 80, can assist the user in making a determination of whether to trust the driver. Having the instructions and ride details available can remind the user whether the ride was successful or unsuccessful. For example, if the driver followed the instructions of the user when picking up the rider, the user may be more likely to trust the driver in the future.

When a certain user makes a request for ride, the on-demand and scheduling service system 150 retrieves the data of trusted drivers, which can be present in the user's circle of trust and/or in the bookmarks, and assign the most trusted driver for the requested ride. User can add the driver he trusts to his circle of trust and to his bookmarks, and when he requests a ride these trusted drivers can be selected and assigned by the system for his ride.

In some implementations, a trusted driver may be in high demand among users, e.g., because the driver has a high rating, such as for providing prompt rides, following instructions, etc. Demand for a driver can be dynamically calculated using trust levels of that driver as rated by multiple users. Based on the trust rating of the driver, the quoted fare can be adjusted by the driver or automatically by the system, such as to reflect an increased demand for the driver. The aggregate trust rating of the user (e.g., the trust barometer value) for different drivers and average fare price can be stored in the functional database. The driver can set or alter a rate of fare for the ride to charge more or less and leverage a high trust barometer. In some implementations, the user is notified about fare charge and has an opportunity to accept the change in fare and keep the scheduled ride, or reject the change and cancel the ride.

Application rules 22 are a component of data processing logic of a program or application which controls the overall flow of data processing through the program or application. Application rules 22 are a formal expression of application functionality for a state of the application, and the application rules 22 determine how data can be created, stored, changed, accessed or displayed through an application or program in response to one or more inputs.

An example of an application rule can include the process for selecting a driver responsive to a user's request for ride. For instance, when the user sends a request for ride, the on-demand and scheduling service system 150 selects and assigns a trusted driver and forwards the user request to that driver. The selection of driver and the forwarding of the user's request to the selected driver is performed according to configurable application rules, such as rules specifying a threshold distance from the pick-up within which drivers available to be selected by the on-demand and scheduling service system 150 should be currently located. For instance, the on-demand and scheduling service system 150 may consider only those drivers currently located within a 3-mile radius of the pick-up location for selection.

An example of an application rule relates a process for enabling a driver to accept a user's request for ride. For instance, configurable application rules can specify a time threshold within which a selected driver is to accept the user's request for ride. For instance, when the system forwards the user's request for ride to a selected driver, the driver can accept this request according to configurable application rules. For example, the driver can only accept the request within 15 seconds after receiving it.

An example of an application rule relates to notifications to a user about a driver's estimated arrival time. When a driver accepts the user's request for ride and leaves for the pick-up location, the user is notified about the driver's estimate arrival time. These notifications are sent according to configurable application rules. For example, the on-demand and scheduling service system 150 notifies the user when the driver is estimated to be 10 minutes away and again when the driver is estimated to be 5 minutes away.

An example of an application rule relates to instructions or permissions. When a user requests a ride, the user can provide secure text, audio, video instructions/permissions for pick-up. Configurable application rules can specify criteria for these instructions or permissions, such as maximum file sizes, maximum durations, a maximum number of separate instructions, or other criteria. For instance, audio or video instructions can be recorded according to one or more configurable application rules specifying that the audio or video length can be no more than, e.g., 10, 15, or 20 seconds.

An example of an application rule relates to driver viewing of instructions or permissions. Configurable application rules can specify criteria related to where the driver is allowed to view the instructions or permissions, the number of times the driver is allowed to view the instructions or permissions, the amount of time the driver is allowed to spend viewing the instructions or permissions, or other criteria. For instance, an application rule may specify that the driver can only view the instruction or permissions after reaching the pick-up location. For instance, the application rule may specify that the driver can view the instructions only once and for a maximum interaction time of 20 seconds.

In some examples, the user can provide one or more criteria that, if satisfied by a particular driver, will eliminate that driver from the user's circle of trust. For instance, the user can specify that no driver who smokes can be included in any level of the user's circle of trust, regardless of any other factors associated with that driver. In some examples, the system can provide a default list of criteria that eliminate drivers from users' circles of trust. In some examples, the system can allow each user to modify the default list of criteria, e.g., by specifying one or more additional criteria or by removing one or more criteria from the default list.

In some examples, the user can specify one or more rules by which a driver is selected and assigned. For instance, the user can restrict the selection and assignment of driver to only those drivers placed in the first level of the user's circle of trust, even though such a restriction may occasionally cause the user to wait for a longer time after requesting a ride.

A user can be prompted for feedback about a driver after each ride. In some examples, if a user does not provide feedback about a driver, the lack of feedback is not taken into account in the calculation of trust, such as in the calculation of the trust barometer value. In some examples, if a user does not provide feedback, a default value is assigned to the driver for use in the calculation of trust, such as an intermediate value indicating that the driver success- fully completed the ride. In this way, a driver is not penalized for providing a ride to a user who is unwilling to provide feedback.

Sometimes, feedback about a driver can be received that is inconsistent with previously received feedback (e.g., the feedback is far more positive or far more negative than an average of past feedback). In some cases, this feedback is taken into account in trust calculations along with other, previous feedback. In some cases, this feedback is disregarded. In some cases, this feedback is taken into account but a user is alerted to the inconsistent feedback when the user is assigned that driver. In some cases, this feedback is taken into account but the driver is given an opportunity to respond, and the user can be alerted to the driver's response when the user is assigned that driver.

In some examples, a driver is automatically selected for a user, but the user is given the opportunity to decline the selection prior to the driver being assigned to the user. For instance, the user may have the opportunity to view past feedback about the driver, may be given an estimate of the selected driver's arrival time, or may be provided with other information. If the user does not want the selected driver assigned for the user's ride, the system can select an alternate driver for the user's ride.

In some examples, the on-demand and scheduling service system 150 can use a similar approach to organize services between service providers and service receivers in industries such as transportation, food delivery, appliances, freight, personal telegram, or other industries.

In some examples, some or all of the processing described above, such as the determination of trust values, the selection and assignment of drivers, or other types of processing, can be carried out on the user's computing device, on one or more centralized computing devices, or via cloud-based processing by one or more servers. In some examples, some types of processing occur on one device and other types of processing occur on another device. In some examples, some or all of the data described above can be stored on the user's computing device, in data storage hosted on one or more centralized computing devices, or via cloud-based storage. In some examples, some data are stored in one location and other data are stored in another location.

Figure 14:
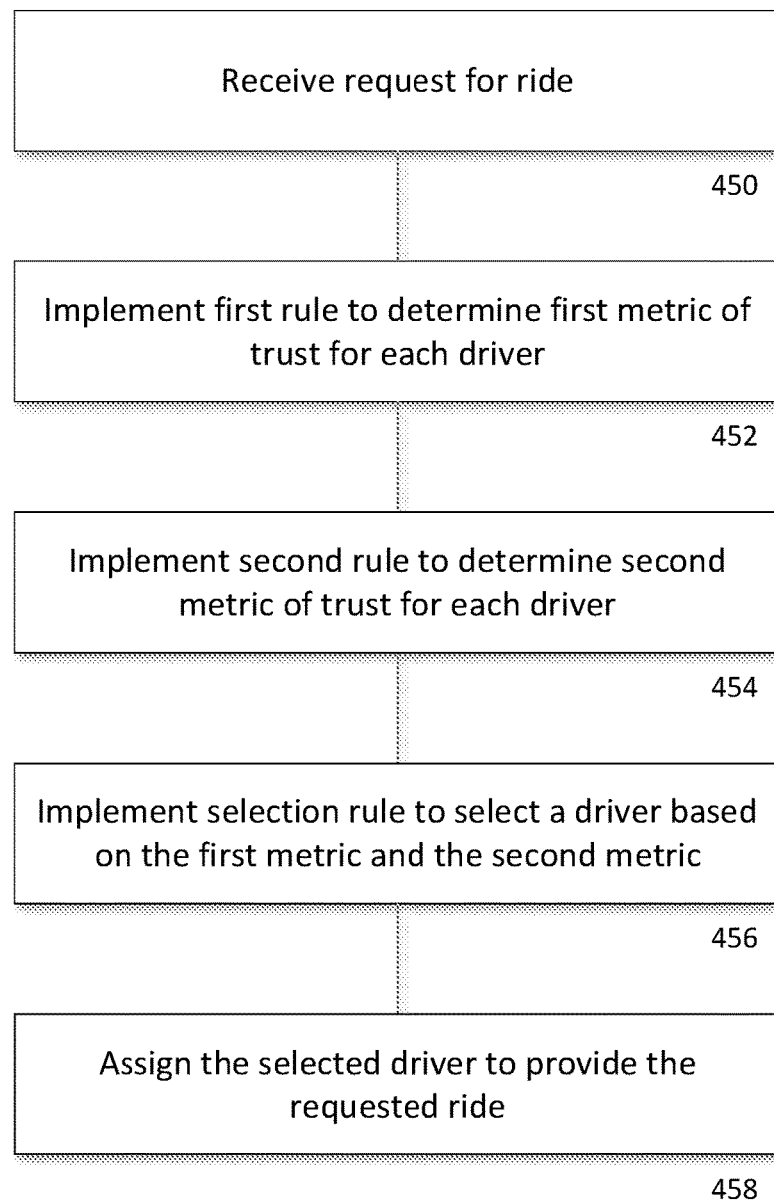
FIG. 14 is a flow chart.

Referring to FIG. 14, in a general approach, a method includes receiving a request for a ride (450). The request can include information such as the pick-up location, drop-off location, start time, special requests, and/or other information.

For each of multiple drivers, a first rule is implemented to determine a first metric of trust for the driver (452). The first level of trust is associated with the user. For instance, implementing the first rule to determine the first metric of trust for each driver can include assigning the driver to a particular level of multiple levels of a circle of trust associated with the user. The first rule can indicate assignment of the driver to a particular level based on information indicative of a past interaction between the user and the driver, based on input from the user indicative of the particular level, or based on other information.

A second rule is implemented for each of multiple drivers to determine a second metric of trust for the driver (454). The second metric of trust is associated with multiple other users of the driver assignment platform. For instance, the second rule can indicate that the second metric of trust is determined based on a rating of the driver from each of one or more of the multiple other users, such as based on ratings from other users connected to the user in a social network. The second rule can indicate that the second metric of trust is based on information indicative of past performance of the driver or based on ride data automatically collected from the driver during one or more rides provided by the driver.

A selection rule is implemented to select a particular driver from the multiple drivers based on a combination of the first metric of trust and the second metric of trust (456). For instance, the selection rule can indicate that the driver having a highest value for the combination of the first metric of trust and the second metric of trust can be selected.

The selected driver is assigned to provide the ride for the user (458). Information about the requested ride can be provided to the selected driver, and information about the assigned driver can be provided to the user.

Figure 15:
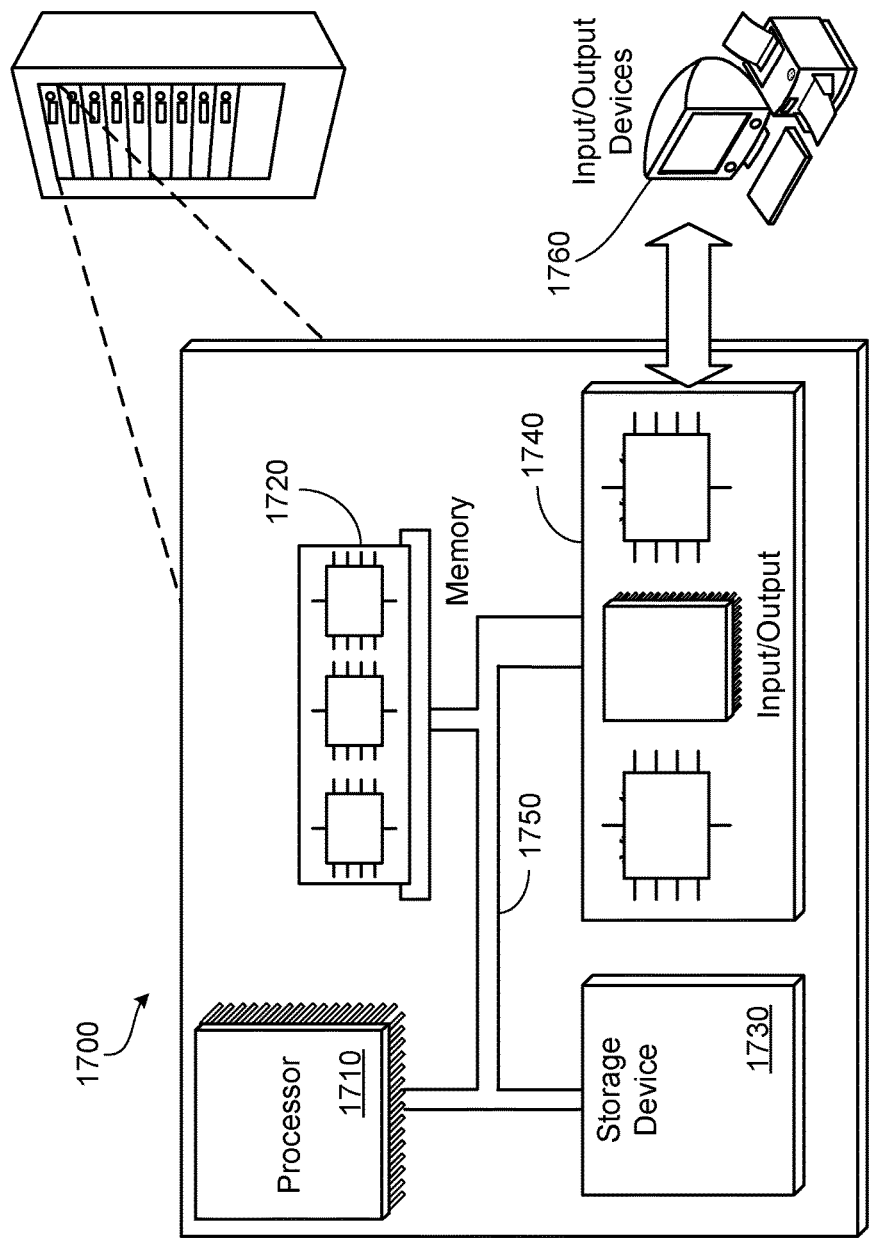
FIG. 15 is a diagram of a computing system.

FIG. 15 is a block diagram of an example computer system 1700 that may be used in implementing the technology described in this document. For example, the system 1700 may include one or more of the engine, database of on-demand and scheduling service system, functional database, data access controller 40, and server request manager. General-purpose computers, network appliances, mobile devices, or other electronic systems associated with the users may also include at least portions of the system 1700. For example, the user interfaces such as the main map 64 screen, bookmarked driver 90 screen, trip detail screen, and my trips 76 screen may be displayed on a computer system 1700. The system 1700 includes a processor 1710, a memory 1720, a storage device 1730, and an input/output device 1740. Each of the components 1710, 1720, 1730, and 1740 may be interconnected, for example, using a system bus 1750. The processor 1710 is capable of processing instructions for execution within the system 1700. In some implementations, the processor 1710 is a single-threaded processor. In some implementations, the processor 1710 is a multi-threaded processor. The processor 1710 is capable of processing instructions stored in the memory 1720 or on the storage device 1730.

The memory 1720 stores information within the system 1700. In some implementations, the memory 1720 is a non-transitory computer-readable medium. In some implementations, the memory 1720 is a volatile memory unit. In some implementations, the memory 1720 is a non-volatile memory unit.

The storage device 1730 is capable of providing mass storage for the system 1700. In some implementations, the storage device 1730 is a non-transitory computer-readable medium. In various different implementations, the storage device 1730 may include, for example, a hard disk device, an optical disk device, a solid-date drive, a flash drive, or some other large capacity storage device. For example, the storage device may store long-term data, such as data stored in the functional database, the file system data, or the database of the on-demand and scheduling service system. The input/output device 1740 provides input/output operations for the system 1700. In some implementations, the input/output device 1740 may include one or more of a network interface device, e.g., an Ethernet card, a serial communication device, e.g., an RS-232 port, and/or a wireless interface device, e.g., an 802.11 card, a 3G wireless modem, or a 4G wireless modem. A network interface device allows the system 1700 to communicate, for example, the server communication between the functional database 48 and the on-demand and scheduling service system or between the on-demand scheduling service system and the file system data. In some implementations, the input/output device may include driver devices configured to receive input data and send output data to other input/output devices, e.g., keyboard, printer and display devices 1760. In some implementations, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1730 may be implemented in a distributed way over a network, such as a server farm or a set of widely distributed servers, or may be implemented in a single computing device.

Although an example processing system has been described in FIG. 12, implementations of the subject matter and the functional operations described above may be implemented in other types of digital electronic circuitry, or in computer software, firmware, or hardware, including the structures disclosed in this specification and their structural equivalents, or in combinations of one or more of them. Implementations of the subject matter described in this specification may be implemented as one or more computer program products, i.e., one or more modules of computer program instructions encoded on a tangible program carrier, for example a non-transitory computer-readable medium, for execution by, or to control the operation of, a processing system. The non-transitory computer readable medium may be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) may be written in any form of programming language, including compiled or interpreted languages, or declarative or procedural languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory may be supplemented by, or incorporated in, special purpose logic circuitry. Computers used in the system may be general purpose computers including mobile devices, custom-tailored special purpose electronic devices, or combinations of the two.

Implementations may include a back end component, e.g., a data server, or a middleware component, e.g., an application server, or a front end component, e.g., a client computer having a graphical user interface or a Web browser through which a user may interact with an implementation of the subject matter described is this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

Certain features that are described above in the context of separate implementations may also be implemented in combination in a single implementation. Conversely, features that are described in the context of a single implementation may be implemented in multiple implementations separately or in any sub-combinations.

The order in which operations are performed as described above may be altered. In certain circumstances, multitasking and parallel processing may be advantageous. The separation of system components in the implementations described above should not be understood as requiring such separation.

It is contemplated for embodiments described herein to extend to individual elements and concepts described herein, independently of other concepts, ideas or system, as well as for embodiments to include combinations of elements recited anywhere in this application. Present embodiments are described here in detail with reference to the accompanying drawings, and this invention is not limited to this particular embodiment.

This invention has been described in terms of particular embodiments and applications, and preceding description contains significant details. It should not be interpreted as limiting the scope of the invention but rather as providing illustrations of the preferred embodiments of the invention, and it will be understood that many substitutions, changes and variations in the described embodiments, applications and details of the method and system illustrated herein and of their operation can be made by those skilled in the art without departing from the spirit of this invention.

Other implementations are also within the scope of the following claims.

What is claimed is:

1. A method including:
   determining, in advance of receiving a request for a ride from a user via a computer-implemented driver assignment platform, trust-related data for each of multiple drivers, by:
      implementing, by the driver assignment platform, (1) a first rule to determine a first metric of trust for the driver, the first metric of trust associated with the user, and (2) a second rule to determine a second metric of trust for the driver, the second metric of trust based on a rating of the driver by each of multiple other users of the driver assignment platform, the multiple other users being connected to the user in a social network; and
      determining, based on a combination of the first metric of trust and the second metric of trust for each of the multiple drivers, the trust-related data representing a level of trust for each of the multiple drivers;
   filtering, from the multiple drivers, one or more drivers having an unsatisfactory trust level compared to a specified threshold, the trust level being represented by the trust related-data, to generate a group of eligible drivers;
   presenting, via an interface of the computer-implemented driver assignment platform, a visualization summarizing the group of eligible drivers, in which presenting the visualization comprises:
      defining a plurality of regions in the visualization, each region representing a priority for assignment of one or more drivers, represented in the region, for providing the ride; and
      presenting, in the visualization, one or more selectable controls each representing an eligible driver from the group of eligible drivers, including positioning each selectable control in one of the defined regions based on the trust-related data associated with the eligible driver represented by the selectable control, wherein one or more of the selectable controls is configured to be moveable from a first region of the plurality of regions to a second region of the plurality of regions to change the priority for assignment of the eligible driver represented by that selectable control for providing the ride;
   receiving the request for the ride from the user via the computer-implemented driver assignment platform;
   implementing, by the driver assignment platform, a selection rule to select a particular driver from the group of eligible drivers based on the trust-related data for each of the one or more eligible drivers and the positions of each of the one or more selectable controls in the plurality of regions;
   updating a state of an application to indicate assignment of the selected driver to provide the ride for the user; and
   updating the visualization to show the selected driver.

2. The method of claim 1, in which implementing the selection rule includes selecting the driver having a highest value for the combination of the first metric of trust and the second metric of trust.

3. The method of claim 1, in which implementing a first rule to determine a first metric of trust includes assigning the driver to a particular level of multiple levels of a circle of trust associated with the user.

4. The method of claim 3, including assigning the driver to the particular level based on information indicative of a past interaction between the user and the driver.

5. The method of claim 3, including assigning the driver to the particular level based on input from the user indicative of the particular level.

6. The method of claim 1, in which implementing a second rule to determine a second metric of trust includes determining the second metric of trust based on information indicative of past performance of the driver.

7. The method of claim 1, in which implementing a second rule to determine a second metric of trust includes determining the second metric of trust based on ride data automatically collected from the driver during one or more rides provided by the driver.

8. The method of claim 1, including setting a fare for the ride based on one or more of the first metric of trust and the second metric of trust for the selected driver.

9. The method of claim 1, including:
implementing, by the driver assignment platform, a selection rule to select a second driver from the multiple drivers based on a combination of the first metric of trust and the second metric of trust; and
assigning the second driver as a back-up driver for the ride.

10. The method of claim 1, including:
providing information about the requested ride to the selected driver; and
receiving confirmation from the selected driver,
in which the selected driver is assigned to provide the ride for the user upon receipt of confirmation from the selected driver.

11. The method of claim 1, including providing information about the selected driver to the user.

12. The method of claim 1, including enabling rendering of a graphical display of the first metric for each of multiple drivers.

13. The method of claim 12, in which the graphical display includes multiple concentric circles, and in which each driver is positioned within one of the multiple concentric circles based on the first metric for the driver.

14. The method of claim 1, wherein determining the trust-related data comprises pre-calculating the trust-related data, and wherein pre-calculating the trust-related data reduces a computation time for responding to the request for the ride from the user relative to a computation time for responding to the request without pre-calculating the trust-related data.

15. A non-transitory computer readable medium storing instructions for causing a computing system to:
determine, in advance of receiving a request for a ride from a user via a computer-implemented driver assignment platform, trust-related data for each of multiple drivers, by:
implementing, by the driver assignment platform, (1) a first rule to determine a first metric of trust for the driver, the first metric of trust associated with the user, and (2) a second rule to determine a second metric of trust for the driver, the second metric of trust based on a rating of the driver by each of multiple other users of the driver assignment platform, the multiple other users being connected to the user in a social network; and
determining, based on a combination of the first metric of trust and the second metric of trust for each of the multiple drivers, the trust-related data representing a level of trust for each of the multiple drivers;
filter, from the multiple drivers, one or more drivers having an unsatisfactory trust level compared to a specified threshold, the trust level being represented by the trust related-data, to generate a group of eligible drivers;
present, via an interface of the computer-implemented driver assignment platform, a visualization summarizing the group of eligible drivers, in which presenting the visualization comprises:
defining a plurality of regions in the visualization, each region representing a priority for assignment of one or more drivers, represented in the region, for providing the ride; and
presenting, in the visualization, one or more selectable controls each representing an eligible driver from the group of eligible drivers, including positioning each selectable control in one of the defined regions based on the trust-related data associated with the eligible driver represented by the selectable control, wherein one or more of the selectable controls is configured to be moveable from a first region of the plurality of regions to a second region of the plurality of regions to change the priority for assignment of the eligible driver represented by that selectable control for providing the ride;
receive the request for the ride from the user via the computer-implemented driver assignment platform;
implement, by the driver assignment platform, a selection rule to select a particular driver from the group of eligible drivers based on the trust-related data for each of the one or more eligible drivers and the positions of each of the one or more selectable controls in the plurality of regions;
update a state of an application to indicate assignment of the selected driver to provide the ride for the user; and
update the visualization to show the selected driver.

16. The non-transitory computer readable medium of claim 15, in which implementing the selection rule includes selecting the driver having a highest value for the combination of the first metric of trust and the second metric of trust.

17. The non-transitory computer readable medium of claim 15, in which implementing a first rule to determine a first metric of trust includes assigning the driver to a particular level of multiple levels of a circle of trust associated with the user.

18. The non-transitory computer readable medium of claim 15, in which the instructions cause the computing system to set a fare for the ride based on one or more of the first metric of trust and the second metric of trust for the selected driver.

19. The non-transitory computer readable medium of claim 15, in which the instructions cause the computing system to:
implement a selection rule to select a second driver from the multiple drivers based on a combination of the first metric of trust and the second metric of trust; and
assign the second driver as a back-up driver for the ride.

20. The non-transitory computer readable medium of claim 15, in which the instructions cause the computing system to enable rendering of a graphical display of the first metric for each of multiple drivers.

21. The non-transitory computer readable medium of claim 20, in which the graphical display includes multiple concentric circles, and in which each driver is positioned within one of the multiple concentric circles based on the first metric for the driver.

22. A computing system including:
a processor and memory configured to:
determine, in advance of receiving a request for a ride from a user via a computer-implemented driver assignment platform, trust-related data for each of multiple drivers, by:
implementing, by the driver assignment platform, (1) a first rule to determine a first metric of trust for the driver, the first metric of trust associated with the user, and (2) a second rule to determine a second metric of trust for the driver, the second metric of trust based on a rating of the driver by each of multiple other users of the driver assignment platform, the multiple other users being connected to the user in a social network; and
determining, based on a combination of the first metric of trust and the second metric of trust for each of the multiple drivers, the trust-related data representing a level of trust for each of the multiple drivers;

filter, from the multiple drivers, one or more drivers having an unsatisfactory trust level compared to a specified threshold, the trust level being represented by the trust related-data, to generate a group of eligible drivers;

present, via an interface of the computer-implemented driver assignment platform, a visualization summarizing the group of eligible drivers, in which presenting the visualization comprises:

defining a plurality of regions in the visualization, each region representing a priority for assignment of one or more drivers, represented in the region, for providing the ride; and presenting, in the visualization, one or more selectable controls each representing an eligible driver from the group of eligible drivers, including positioning each selectable control in one of the defined regions based on the trust-related data associated with the eligible driver represented by the selectable control, wherein one or more of the selectable controls is configured to be moveable from a first region of the plurality of regions to a second region of the plurality of regions to change the priority for assignment of the eligible driver represented by that selectable control for providing the ride;

receive the request for the ride from the user via the computer-implemented driver assignment platform;

implement, by the driver assignment platform, a selection rule to select a particular driver from the group of eligible drivers based on the trust-related data for each of the one or more eligible drivers and the positions of each of the one or more selectable controls in the plurality of regions;

update a state of an application to indicate assignment of the selected driver to provide the ride for the user; and update the visualization to show the selected driver.

23. The computing system of claim 22, in which implementing the selection rule includes selecting the driver having a highest value for the combination of the first metric of trust and the second metric of trust.

24. The computing system of claim 22, in which implementing a first rule to determine a first metric of trust includes assigning the driver to a particular level of multiple levels of a circle of trust associated with the user.

25. The computing system of claim 22, in which implementing a second rule to determine a second metric of trust includes determining the second metric of trust based on a rating of the driver from each of one or more of the multiple other users.

26. The computing system of claim 22, in which the processor and memory are configured to set a fare for the ride based on one or more of the first metric of trust and the second metric of trust for the selected driver.

27. The computing system of claim 22, in which the processor and memory are configured to enable rendering of a graphical display of the first metric for each of multiple drivers.

* * * * *